(12) United States Patent
Nezou et al.

(10) Patent No.: US 9,380,577 B2
(45) Date of Patent: Jun. 28, 2016

(54) METHOD AND DEVICE FOR COLLABORATIVE DATA COMMUNICATION IN A RADIO NETWORK

(71) Applicant: CANON KABUSHIKI KAISHA, Tokyo (JP)

(72) Inventors: Patrice Nezou, Saint-Sulpice la Foret (FR); Pascal Viger, Janze (FR); Julien Sevin, Saint Aubin du Cormier (FR)

(73) Assignee: Canon Kabushiki Kaisha, Tokyo (JP)

( * ) Notice: Subject to any disclaimer, the term of this patent is extended or adjusted under 35 U.S.C. 154(b) by 307 days.

(21) Appl. No.: 13/761,589

(22) Filed: Feb. 7, 2013

(65) Prior Publication Data

US 2013/0208708 A1 Aug. 15, 2013

(30) Foreign Application Priority Data

Feb. 10, 2012 (GB) .................................. 1202358.6

(51) Int. Cl.
*H04W 72/04* (2009.01)
*H04W 74/08* (2009.01)

(52) U.S. Cl.
CPC .......... *H04W 72/0446* (2013.01); *H04W 74/08* (2013.01)

(58) Field of Classification Search
CPC . H04W 72/0446; H04W 74/08; H04W 24/00; H04W 24/10; H04W 28/20; H04W 72/042; H04W 72/0453; H04W 74/0816; H04W 84/12; H04W 88/08; H04W 72/14; H04W 74/085; H04L 5/0037
See application file for complete search history.

(56) References Cited

U.S. PATENT DOCUMENTS

| | | | |
|---|---|---|---|
| 7,042,897 B1* | 5/2006 | Sivaprakasam et al. | 370/462 |
| 2002/0141435 A1 | 10/2002 | Newberg et al. | |
| 2004/0162093 A1* | 8/2004 | Bevan et al. | 455/502 |
| 2005/0058151 A1* | 3/2005 | Yeh | 370/445 |
| 2005/0075142 A1* | 4/2005 | Hoffmann et al. | 455/562.1 |
| 2006/0114867 A1* | 6/2006 | Du et al. | 370/338 |
| 2010/0054213 A1* | 3/2010 | Trainin | 370/336 |
| 2010/0093364 A1* | 4/2010 | Ribeiro et al. | 455/452.2 |
| 2010/0176929 A1* | 7/2010 | Ozdemir et al. | 340/10.4 |
| 2011/0261740 A1* | 10/2011 | Loc et al. | 370/311 |
| 2012/0099450 A1* | 4/2012 | Madan et al. | 370/252 |
| 2012/0287849 A1* | 11/2012 | Wilczewski | 370/328 |
| 2015/0003367 A1* | 1/2015 | Seok | 370/329 |

FOREIGN PATENT DOCUMENTS

| | | |
|---|---|---|
| EP | 1741243 A2 | 1/2007 |
| GB | 2449232 A | 11/2008 |
| WO | WO2006/098891 A2 | 9/2006 |
| WO | WO2012/002705 A2 | 1/2012 |

* cited by examiner

*Primary Examiner* — Yee Lam
(74) *Attorney, Agent, or Firm* — Canon USA Inc. IP Division

(57) ABSTRACT

The present invention relates to communication between collaborative nodes configured to collaboratively communicate in a radio network. A corresponding method comprises: sending, by each active node of the set of collaborative nodes, an RTS message for the same transmission slot; sending, by one of the active nodes, referred to as coordinator node, a CTS message to acknowledge reservation of said transmission slot on behalf of all the active nodes, upon receiving the RTSs; wherein the transmission slot is divided, based on the sent RTSs, into sub-slots for respective active nodes to transmit data packets. The invention provides an improved use of the reserved transmission slot, and a reduced waste of reserved time.

28 Claims, 10 Drawing Sheets

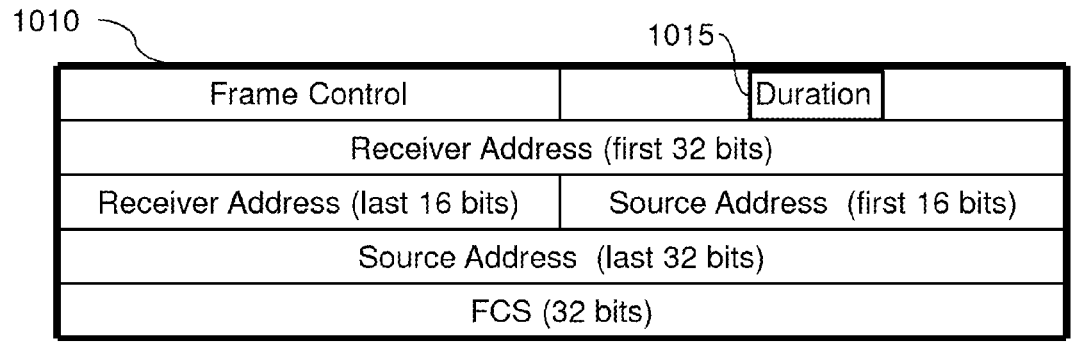
(11A)
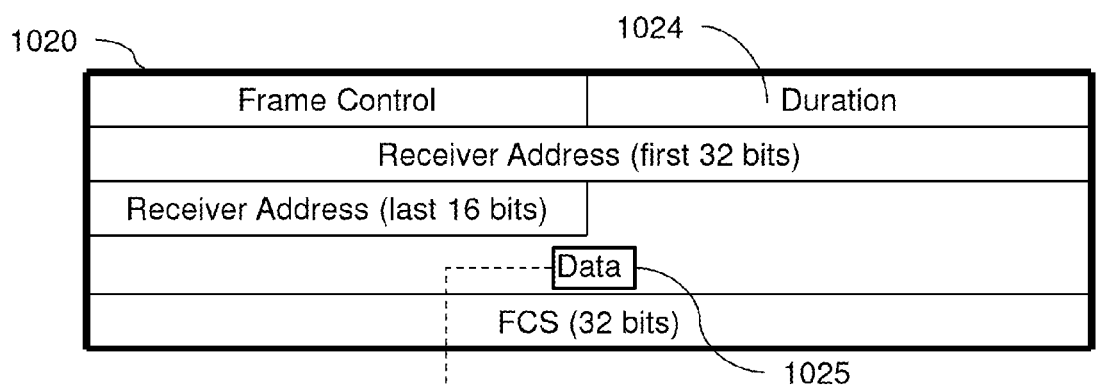
(11B)
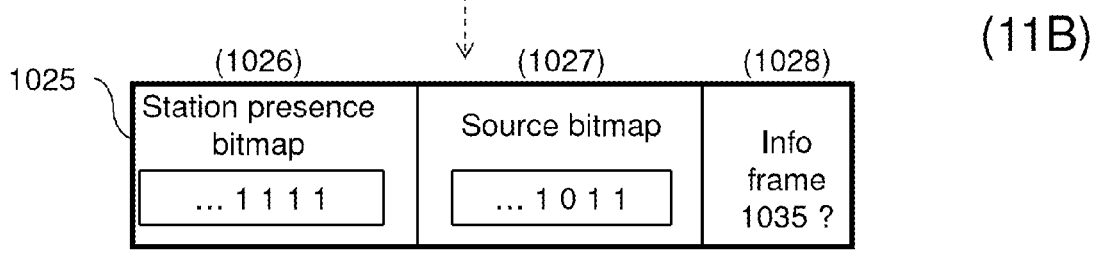
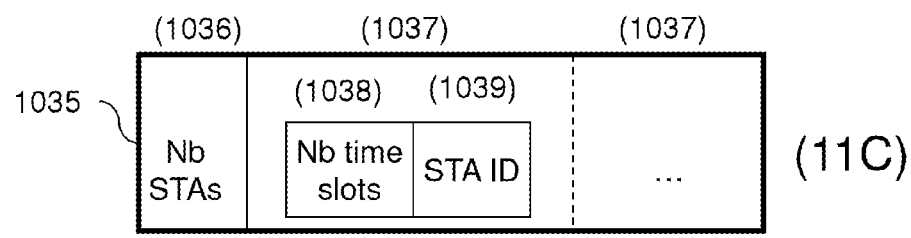
(11C)
Fig. 11

METHOD AND DEVICE FOR COLLABORATIVE DATA COMMUNICATION IN A RADIO NETWORK

This application claims priority from GB patent application number 1202358.6 of Feb. 10, 2012, which is incorporated by reference herein in its entirety.

FIELD OF THE INVENTION

The present invention relates generally to radio networks and more specifically to methods and devices for accessing the same transmission slot by multiple nodes, so as to enable collaborative data communication.

BACKGROUND OF THE INVENTION

The 802.11 MAC (standing for Medium Access Control) standard supports access to a shared wireless or radio medium through a technique called Carrier Sense Multiple Access with Collision Avoidance (CSMA/CA). The 802.11 standard is mainly directed to the waiting management of nodes waiting for the medium to become idle so as to try accessing to the medium.

FIG. 1 illustrates a communication system in which several communicating nodes exchange data packets over a radio transmission channel 100 of a wireless local area network (WLAN).

Access to the shared radio medium to send data packets is based on the CSMA/CA technique, for sensing the carrier and avoiding collision by separating concurrent transmissions in space and time.

Carrier sensing in CSMA/CA is performed by both physical and virtual mechanisms. The virtual carrier sensing is achieved by transmitting control packets to reserve the medium prior to transmission of data packets.

Then after, through the physical mechanism, a transmitting node first attempts to sense a medium that has been idle for at least one DIFS (standing for Distributed InterFrame Spacing) time period, before transmitting data packets.

However, if it is sensed that the shared radio medium is busy during the DIFS period, the transmitting node waits until the radio medium becomes idle and then starts a countdown backoff counter designed to expire after a number of timeslots, chosen randomly between [0,CW], CW being referred to as the contention window. This backoff mechanism is the basis of the collision avoidance mechanism that defers the transmission time for a random interval, thus reducing the probability of collisions on the shared channel. After the backoff time period, the transmitting node may send the data packets.

One of the problems of wireless data communications is that it is not possible for the transmitting node to listen while sending, thus preventing the transmitting node from detecting data corruption due to channel fading or interference or collision phenomenon. A transmitting node remains unaware of the corruption of the data packets sent and continues to transmit the packets unnecessarily, thus wasting access time.

Collision Avoidance mechanism of CSMA/CA thus provides positive acknowledgement (ACK) of the sent data packets by the receiving node in case of successful packet reception, to warn the transmitting node that no corruption of the sent data packets occurred.

The ACK is transmitted at the end of reception of the data packet, immediately after a period of time called Short InterFrame Space (SIFS).

If the transmitting node does not receive the ACK within a specified ACK timeout or detects the transmission of a different packet on the channel, it may infer data packet loss. In that case, it generally reschedules the packet transmission according to the above-mentioned backoff rule.

To improve the Collision Avoidance efficiency of CSMA/CA, a four-way handshaking mechanism is optionally implemented. One implementation is known as the RTS/CTS exchange, defined in the 802.11 standard.

The RTS/CTS exchange consists in exchanging control packets to reserve the radio medium prior to transmitting data packets during a transmission opportunity called TXOP in the 802.11 standard, thus protecting data transmissions from any further collisions.

As illustrated in FIG. 2, a transmitting node ("source" in the Figure) that wants to transmit data packets, sends a special short frame or message acting as a medium access request to reserve the radio medium, instead of the data packets themselves, just after the channel has been sensed idle for a DIFS or after the backoff period as explained above. The medium access request is known as a Request-To-Send (RTS) message. It is generally sent at a low transmission bit rate to avoid transmission error, compared to the transmission bit rate used to transmit the data packets themselves.

The RTS message generally comprises the address of the receiving node ("destination" in the Figure) and the duration for which the radio medium is to be reserved for transmitting the control packets and the data packets.

Upon receiving the RTS message and if sensing the radio medium as being idle, the receiving node responds, after a SIFS time period, with a medium access response, known as a Clear-To-Send (CTS) message. The CTS message is also sent at the low transmission bit rate, and comprises the remaining time required for transmitting the data packets, computed from the time point at which the CTS message is sent.

The CTS message is considered by the transmitting node as an acknowledgment of its request to reserve the shared radio medium for a given time.

The transmitting node is thus allowed to send the data packets upon correctly receiving the CTS message and after a new SIFS time period. ACK messages are sent by the receiving node after having correctly received the data packets sent.

The required time for transmission defined in the RTS and CTS messages can be read by any listening node ("other" in FIG. 2) in the radio network.

Each node has in memory a data structure known as the network allocation vector or NAV to store the duration of time for which it is known that the medium will be busy. When listening to a control packet (RTS or CTS) not addressed to itself, a listening node updates its NAV with the required transmission time duration specified in the control packet. The listening node thus keeps in memory the period of time for which the radio medium will remain busy. This prevents the listening nodes from transmitting any data or control packets during that period.

One may note that the receiving node may not always respond to a RTS message that is addressed to it, for example because it might not have received the RTS correctly due to collision or fading, or because its NAV might have been set. In such cases, the transmitting node will not receive a CTS message in response and thus will enter into the random backoff mechanism before resending the RTS message.

The RTS/CTS mechanism is very efficient in terms of system performance, in particular with regard to large packets since it reduces the length of the messages involved in the contention process. In detail, assuming perfect channel sensing by every communicating node, collision may only occur when two (or more) packets are transmitted within the same slot time. But, with the RTS/CTS exchange, it may only occur for the RTS messages, thus providing an early detection of collision by the lack of CTS responses.

The conventional RTS/CTS mechanism, as defined in 802.11, is directed to the reservation of transmission time slots for a transmitting node/receiving node pair.

The publication "Efficient Medium Access Protocols for Wireless and RFID networks" (Shweta Jain, PhD, 2007) discloses protocols for multiple accesses to a radio medium in particular in 802.11 networks. Multicast transmission in one transmission time slot is described in that publication.

To achieve such multicast transmission in one transmission time slot, the transmitting node first sends an RTS message containing the addresses of the multiple receiving nodes for which data packets are intended. In response to the RTS message, the receiving nodes sequentially send respective CTS messages, keeping the order of the receiving nodes as specified in the received RTS message to avoid collision between the CTS messages.

However the approach of that publication is only directed to multicast. It is not suitable when collaborative node communication with multiple transmitting nodes and multiple receiving nodes is sought.

The inventors first thought about a multiple node allocation mechanism that proved not to be fully satisfactory.

Among wireless communicating nodes of a 802.11 network (referred to as "legacy nodes"), a group of collaborative nodes may decide to collaboratively communicate by for example together subscribing to a corresponding collaborative communication distributed service. Any node implementing the present invention may become a collaborative node by joining the group.

Any collaborative node could send an RTS message according to the conventional 802.11 protocol to reserve a TXOP on behalf of the whole collaborative group. The reserved transmission time slot is shared between the collaborative nodes and data packets are transmitted using a new protocol.

However, despites the use of the conventional RTS/CTS exchange, legacy nodes are liable to impact the communicating availability of certain collaborative nodes, for example when the legacy nodes in the vicinity of those collaborative nodes are already involved in a communication exchange. Other collaborative nodes (out of reach of the legacy nodes) are generally not aware of the interference endured by the said certain collaborative nodes and of their un-availabilities.

As a result, certain collaborative nodes are not able to join the group talk or tell the others of their interference difficulties. Any dedicated time sub-slot inside the reserved transmission time slot (e.g. TDMA inside 802.11 TXOP) will thus be lost.

This loss is detrimental to radio network efficiency. This is because since the/a CSMA/CA-based radio medium (like 802.11) is not deterministic (i.e. with no guarantee of obtaining medium access), any waste of reserved time should be avoided.

As a consequence, there is a need to provide a better communication method that efficiently uses the reserved transmission time slot.

The present invention has been devised to address at least one of the foregoing concerns, in particular to provide efficient collaborative communication between nodes of a radio network.

SUMMARY OF THE INVENTION

In this context, according to a first aspect of the invention, there is provided a method for data communication between nodes of a set of collaborative nodes configured to collaboratively communicate in a radio network, the method comprising:

sending, by each active node of the set of collaborative nodes, a medium access request for the same transmission slot, over the radio network;

sending, by one of the active nodes, referred to as coordinator node, a medium access response to acknowledge reservation of said transmission slot on behalf of all the active nodes, upon receiving the sent medium access requests, wherein the transmission slot is divided, based on the sent medium access requests, into sub-slots for respective active nodes to transmit data packets.

The "active nodes" form a sub-set of the collaborative nodes (possibly the whole set of collaborative nodes). According to the invention, these active nodes send a medium access request. As explained below, this sub-set may be composed of synchronized collaborative nodes that synchronously detect the expiry of a backoff counter associated to one of the collaborative nodes.

The present invention provides an improved use of the reserved transmission slot than the above prior art approach, so drastically reducing any waste of reserved time.

This is achieved by requiring some of the collaborative nodes (above the active nodes) that wish to use a transmission sub-slot to send a medium access request and then by providing a division of the transmission slot into sub-slots providing transmission time for these particular collaborative nodes. This is because the requests sent first lock out other legacy nodes to prevent them from making new data transmissions and then can be used to determine exactly which nodes are available to share a transmission slot. The division of the transmission slot can thus be made based on the sent requests to optimise use of the time slot.

Waste of reserved time is thus avoided.

Furthermore, due to the number of requests sent and corresponding locking out of legacy nodes, the reserved coverage area is maximized and interferences with legacy nodes is reduced.

This definition gives an overview of the functioning of the invention. A preferred application is within CMSA/CA-based radio networks using RTS/CTS exchanges. In that case, the active nodes send a request-to-send (RTS) message of a Carrier Sense Multiple Access with Collision Avoidance protocol (CSMA/CA), and the coordinator node sends in response a Clear-To-Send (CTS) message of the same protocol. This is particularly adapted to access to 802.11 networks.

The application to RTS/CTS exchanges makes it possible to illustrate the improvements resulting from the invention.

In detail, if one of the collaborative nodes does not send an RTS message, meaning that the node is hidden or blocked by a current communication between legacy nodes, it cannot obtain sub-part of the reserved transmission time slot TXOP to exchange data packets with another collaborative node. Such hidden or blocked node appears to be desynchronized with the "active" nodes.

Sending multiple RTS messages by multiple collaborative nodes makes it possible to reserve bandwidth and lock potential-disturbing legacy nodes (i.e. in close distance to collaborative nodes) for future communications between the collaborative nodes. Analyzing the RTS messages makes it possible to determine the number of collaborative nodes available to exchange data packets in the granted TXOP, as well as the requested communications for which the received node is missing. Fair sharing of the reserved transmission slot may thus be made based on this information.

Correspondingly, according to a second aspect of the invention, there is provided a network system for data communication between nodes of a set of collaborative nodes configured to collaboratively communicate in a radio network, the system comprising:

active nodes of the set of collaborative nodes configured to send respective medium access requests for the same transmission slot, over the radio network;

wherein one of the active nodes, referred to as coordinator node, is configured to send a medium access response to acknowledge reservation of said transmission slot on behalf of all the active nodes, upon receiving the sent medium access requests, the transmission slot being divided, based on the sent medium access requests, into sub-slots for respective active nodes to transmit data packets.

The network system provides the same advantages as the data communication method defined above.

From one collaborative node's point of view, the invention, according to a third aspect, concerns a method for data communication between nodes of a set of collaborative nodes defined to collaboratively communicate in a radio network, the method comprising, at one collaborative node:

sending, over the radio network, a medium access request for a transmission slot;

receiving, over the radio network, medium access requests for the same transmission slot from several respective active nodes of the set of collaborative nodes;

based on the received medium access requests and on a predefined node order known by each collaborative node, determining whether said one collaborative node is a coordinator node which acknowledges reservation of said transmission slot on behalf of all the active nodes, or not;

if said one collaborative node is a coordinator node, sending a medium access response to acknowledge reservation of said transmission slot on behalf of all the active nodes, wherein the medium access response specifies, based on the sent and received medium access requests, the division of the transmission slot into sub-slots for respective active nodes to transmit data packets.

Correspondingly, according to a fourth aspect of the invention, there is provided a communicating collaborative node for data communication with other nodes of a set of collaborative nodes configured to collaboratively communicate in a radio network, the node comprising:

a transmitting module for sending, over the radio network, a medium access request for a transmission slot;

a receiving module for receiving, over the radio network, medium access requests for the same transmission slot from several respective active nodes of the set of collaborative nodes;

a coordinator determining module for determining, based on the received medium access requests and on a predefined node order known by each collaborative node, whether said communicating collaborative node is a coordinator node which acknowledges reservation of said transmission slot on behalf of all the active nodes, or not; and a coordinator module for sending, if said communicating collaborative node is a coordinator node, a medium access response to acknowledge reservation of said transmission slot on behalf of all the active nodes, wherein the medium access response specifies, based on the sent and received medium access requests, the division of the transmission slot into sub-slots for respective active nodes to transmit data packets.

The method and node as defined above also provide the same advantages as defined previously, in particular that of improving the use of the reserved transmission slot and thus of reducing any waste of reserved time Further features of the invention are defined in the dependent appended claims.

For example, the active nodes may send the medium access requests one after the other according to a predefined node order known by each collaborative node. This provision avoids collision between the active nodes when reserving the same transmission time slot.

In particular, the node order is defined according to an increasing interference level within an interference level table known by each collaborative node, the interference level table having node entries that associate each collaborative node with an estimated level of interference between the associated collaborative node and nodes external to the set (or legacy nodes). Optional particularities of this table are defined below, in particular when giving details about the medium access response and the coordinator node.

In a variant order different from an interference-based order, the node order is defined as a function of a specific value associated with each collaborative node, for instance a unique node identifier. The node identifiers may be stored within the above interference level table.

According to a feature of the invention, each collaborative node has an associated backoff counter to implement a Collision Avoidance mechanism, the value of all the backoff counters being known by all the collaborative nodes, and sending the medium access requests by the active nodes starts from the expiry of the first backoff counter among all backoff counters. This provision ensures synchronization of all the collaborative nodes in order to send their respective medium access request when possible. Of course a predefined order for sending the requests is preferentially used as introduced above.

According to a particular feature, the method further comprises determining, by each collaborative node, a time point after said expiry of the first backoff counter among all backoff counters at which that collaborative node has to send its own medium access request, based on a predefined node order known by each collaborative node and the size of a medium access request. This provision contributes to obtaining a schedule appropriate for collision avoidance.

In particular, as briefly introduced above, the active nodes may be nodes of the set of collaborative nodes that synchronously detect an expiry of a backoff counter among backoff counters associated with each of the collaborative nodes. In practice such an expiry is the first expiry occurring among the backoff counters of the collaborative nodes.

According to another feature of the invention, the medium access requests are sent with a higher transmission bit rate than the transmission bit rate used to send the medium access response by the coordinator node. According to the invention, the multiple medium access requests (such as RTS messages) increase in proportion the data overhead over the radio network. The above provision thus provides an increased transmission bit rate for the requests compared to conventional mechanisms (such as the conventional RTS/CTS protocol) where the same low transmission bit rate is used for both request and response in order to avoid transmission error. It results in a shorter reservation period (which includes requests and response) and thus in an optimized use of the radio network for reservation. The bandwidth consumption is thus reduced together with interferences with legacy nodes. In particular, the higher transmission bit rate may be equal to a transmission bit rate at which the active nodes transmit data packets in the sub-slots.

According to an embodiment of the invention, each active node specifies bandwidth requirements for a next transmission opportunity in the medium access request it sends. This makes it possible for the coordinator node to dynamically allocate sub-slots of variable size depending on the needs of each collaborative node.

In particular, the medium access request comprises a duration field to specify a needed transmission time (for example to empty the waiting payload currently stored from a MAC buffer for transmission) or taking the value 0 for any active node that has no data packet to send. This provision particularly contrasts with conventional mechanisms that forbid such duration fields to take the value 0. This is because, conventionally, the duration field in medium access request frame is used to define the transmission slot to be reserved based on the medium access request, and thus cannot be zero. Thanks to this provision, some active nodes contribute to the transmission slot reservation but not with a view to sending data. This situation appears helpful to protect the wireless transmission area around that kind of active nodes from transmissions by legacy nodes. This is also useful to keep the above-mentioned interference level table mirroring the exact situation of level of interferences for each collaborative node.

According to another feature of the invention, the coordinator node is selected from among the active nodes based on a predefined node order known by each collaborative node. The coordinator node may thus change at each new transmission opportunity since it must be one of the active nodes, i.e. a synchronized collaborative node among those that detect the expiry of a backoff counter and then sent a medium access request in response as described above. The above provision makes it possible for all the collaborative nodes to determine the same coordinator node, and for each active node to dynamically determine whether or not it is the coordinator node, and thus has to prepare and send the medium access response. In this context, each active node determines whether or not it is the active node with the highest priority in the predefined node order, in which case it operates as the coordinator node.

As introduced above with regard to the request sending order, various node orders may be implemented. In particular, the node order is defined according to an increasing interference level (i.e. priority) within an interference level table known by each collaborative node, the interference level table having node entries that associate each collaborative node with an estimated level of interference between the associated collaborative node and nodes external to the set. That means that the least disturbed node among the active nodes is selected as the coordinator node. Generally it is at the centre of the cell grouping the collaborative nodes, where the communications are little perturbed.

According to a particular feature, the method further comprises updating, by each collaborative node, its local interference level table based on an interference level table transmitted by the coordinator node after the medium access response. This ensures the nodes can synchronize their interference level table since they may differently sense the interference between the various collaborative nodes and legacy nodes. As a consequence, the collaborative nodes are aware of the same node order while the interference level tables may be locally updated as the transmissions are sent. This is particularly important when the coordinator node is dynamically chosen for each new transmission, since transmission interference may vary and affect the previous coordinator node. In particular, each collaborative node updates the level of interference of node entries in its local interference level table based on the absence of received medium access request from the associated collaborative node. This is because it may be considered that failing to send a medium access request, such as an RTS, results from the fact that the corresponding node is disturbed by data transmission of other nodes external to the set of collaborative nodes.

In a variant order different from an interference-based order, the node order is defined as a function of a specific value associated with each collaborative node, for instance a unique node identifier.

According to an embodiment of the invention, the medium access response comprises a duration field, whose value is based on the sum of duration fields included in the medium access requests sent from the active nodes. This provision seeks to reserve a transmission slot that will make it possible for each active node to transmit its entire waiting payload. Of course, this duration field is generally upper bounded to avoid loss of an excessively large reserved transmission slot in case of interference. This provision also contrasts with the conventional approaches according to which the response and the request refer to the same communication duration, as is the case for the conventional RTS/CTS mechanism.

In particular, the value of the duration field in the medium access response equals:

$$\max\{\text{TXOPlimit}; \Sigma\text{REQduration}-\text{SIFS}-\text{RESPlength}\}$$

where TXOPlimit is an upper bound for transmission opportunities, ΣREQduration is the sum of duration fields included in the medium access requests, SIFS is a Short Interframe Space time length and RESPlength is the time length of the medium access response.

According to another embodiment of the invention, the medium access response includes transmission slot division information that indicates the division of the transmission slot into sub-slots and an assignment of each sub-slot to a respective active node. This provision makes it possible to provide a transmission sub-slot to each active node that needs to send data packets, and for each active node to be aware of when it will be authorized to send its data packets.

According to a particular feature, the transmission slot division information comprises a first bitmap ordered according to a predefined node order known by each collaborative node, each bit of which specifying whether or not a collaborative node is an active node. This means that the coordinator node fills the bitmap upon receiving the medium access requests. Thanks to this first bitmap, any active node receiving the medium access response is able to determine the number of sub-slots given that generally one sub-slot is assigned to one node. It is also able to determine the position of its allocated sub-slot and then the time at which it has to send its data packets.

Furthermore, by using the known node order, the bitmap proves to be of the minimum size to transmit the needed information, thus reducing the overhead of the transmission slot division information. Thus only one bit per collaborative node is needed.

In particular, the transmission slot division information comprises a second bitmap with the same ordering, the bits of which specifying whether or not the active nodes needs a sub-slot to transmit data packets. This second bitmap may also be prepared by the coordinator node based on the received medium access requests, the need of a sub-slot being set through the above-mentioned duration field in each request. Using this second bitmap makes it possible to further optimize the use of the transmission slot since, from it, sub-slots may be created for only the active nodes that require bandwidth. Although the second bitmap may be of the same size as the first bitmap, a shorter bitmap may be used that only indicates the need of a sub-slot for each active node (i.e. the active nodes identified in the first bitmap). This reduces the overhead of signalling the active nodes and their bandwidth needs.

As introduced above with regard to the request sending order and the selected coordinator node, various node orders may be implemented for the bitmaps, such as an order based on the interference level table or based on a specific value associated with each collaborative node.

According to another particular feature, the first sub-slot in the divided transmission slot is assigned to the coordinator node. This is particularly advantageous when processes performed by the coordinator node require more time than the time allowed for transmission of the requests and response, since the results of these time consuming processes may then be transmitted to the other active nodes within that first sub-slot or just at the end of it. This is for example the case of the INFO message as defined below which requires more processing than possible in the time available before transmitting the CTS message.

According to yet another particular feature, the division of the transmission slot into sub-slots is based on bandwidth requirements defined by the active nodes in the medium access requests they have sent. A dynamic allocation of sub-slots to the active nodes as a function of their own needs is thus possible. One may note that such real-time update of sub-slot allocation is not supported by the conventional 802.11-based schedulers.

In particular, the method further comprises, at the coordinator node, gathering duration fields in the sent medium access requests, a duration field in a medium access request sent by an active node defining a transmission time needed by that active node, and sizing (i.e. dimensioning) the sub-slots and assigning the sized sub-slots to active nodes according to the gathered duration fields. For example, this may be done proportionally to the bandwidth requirements specified in the duration fields. In particular, no sub-slot is assigned to an active node having sent a medium access request with a duration field equal to 0.

Also, the time lengths of the sub-slots created based on the bandwidth requirements may be defined in sub-slot information transmitted by the coordinator node in the first sub-slot of the reserved transmission slot, said first sub-slot being assigned to the coordinator node. This is because the processing to calculate the duration of the sub-slots for each active node may require more time than is available before sending the medium access response. This provision thus makes it possible for the coordinator node to perform these processes and to inform the other active nodes of the results before they access their assigned-to sub-slots. Of course if there is enough time to generate the sub-slot information before sending the medium access response (CTS), the sub-slot information may be included in said response, for example together with the above-defined first and second bitmaps.

From the point of view of one of the active nodes, if it is not the coordinator node, the method may further comprise waiting to receive a medium access response acknowledging reservation of said transmission slot on behalf of all the active nodes from one of said active nodes (the coordinator node), and determining from the medium access response a sub-slot of the transmission slot to transmit data packets from said one communicating collaborative node.

The features defined above may be implemented in that active node, either as sender of a medium access request, or as the coordinator node when considering building and transmitting the medium access response.

Another aspect of the invention relates to a non-transitory computer-readable medium storing a program which, when executed by a microprocessor or computer system in an apparatus communicating data with other nodes of a set of collaborative nodes configured to collaboratively communicate in a radio network, causes the apparatus to perform the steps of:

sending, over the radio network, a medium access request for a transmission slot;

receiving, over the radio network, medium access requests for the same transmission slot from several respective active nodes of the set of collaborative nodes;

based on the received medium access requests, determining, based on a predefined node order known by each collaborative node, whether said apparatus is a coordinator node which acknowledges reservation of said transmission slot on behalf of all the active nodes;

if said apparatus is a coordinator node, sending a medium access response to acknowledge reservation of said transmission slot on behalf of all the active nodes, wherein the medium access response specifies, based on the sent and received medium access requests, the division of the transmission slot into sub-slots for respective active nodes to transmit data packets.

The non-transitory computer-readable medium may have features and advantages that are analogous to those set out above and below in relation to the methods and the system for data communication, in particular that of improving the use of the reserved transmission slot and thus of reducing any waste of reserved time.

Another aspect of the invention relates to a method for data communication between nodes of a set of collaborative nodes configured to collaboratively communicate in a radio network substantially as herein described with reference to, and as shown in, FIG. 9; FIGS. 9 and 12A; FIGS. 9, 12A and 12B; FIGS. 9, 11, 12A and 12B; FIGS. 8 and 9; FIGS. 7, 8 and 9; FIGS. 6, 7, 8 and 9; FIGS. 6, 7, 8, 9, 12A and 12B of the accompanying drawings.

At least parts of the method according to the invention may be computer implemented. Accordingly, the present invention may take the form of an entirely hardware embodiment, an entirely software embodiment (including firmware, resident software, micro-code, etc.) or an embodiment combining software and hardware aspects which may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium, for example a tangible carrier medium or a transient carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which:

FIG. 3A illustrates function blocks of the same communicating device;

FIG. 11 illustrates the structure of an RTS message (FIG. 11A), of a CTS message (FIG. 11B) and of specific INFO data about sub-slot sizing (FIG. 11C) according to an embodiment of the invention;

DETAILED DESCRIPTION OF EMBODIMENTS OF THE INVENTION

The invention provides communication methods and systems for data transmission in a wireless or radio communication network, where a set or group of communicating nodes seeks to collaboratively communicate by sharing the same reserved transmission time slot. The collaborative nodes should preferably have subscribed to the same collaborative communication service which implements the invention, embodiments of which are described below.

Figure 1:
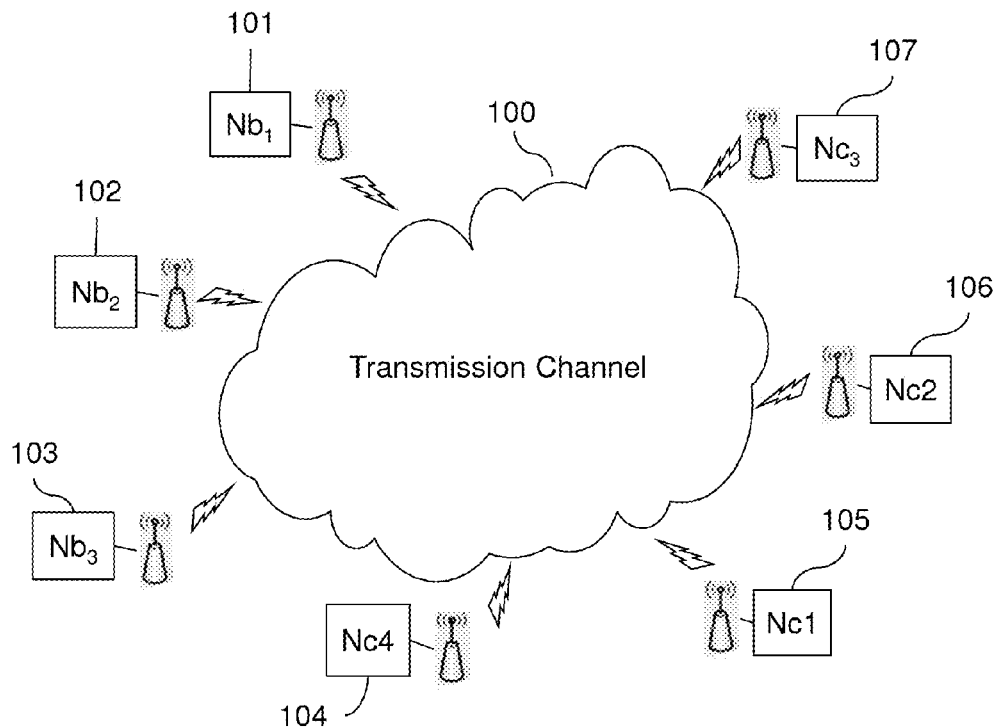
FIG. 1 illustrates a typical wireless communication system in which embodiments of the invention may be implemented.
Figure 2:
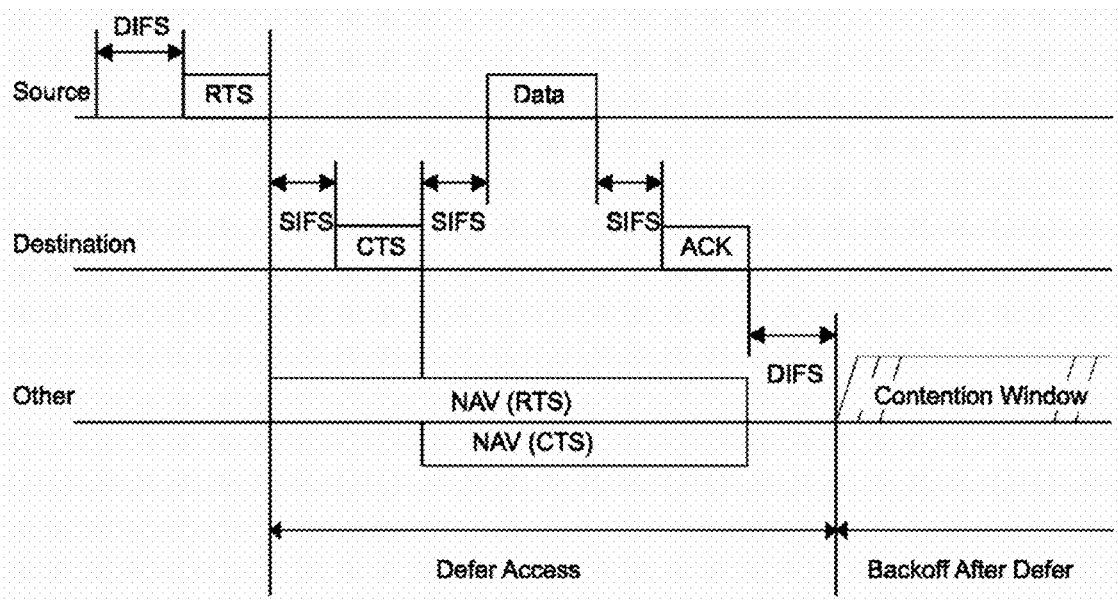
FIG. 2 is a timeline schematically illustrating the conventional RTS/CTS exchange mechanism according to 802.11.

In the example of a 802.11-based wireless communication network implementing CSMA/CA mechanism with RTS/CTS exchange as shown in FIGS. 1 and 2, the group of collaborative nodes implementing the invention is made of nodes $Nc_i$ 104 to 107, while the other nodes of the network, referred to as legacy nodes since they only implement the conventional 802.11 protocol, are nodes 101 to 103 referenced $Nb_i$.

For the sake of illustration, all data exchanges between nodes of the communication system, that is to say nodes $Nc_i$ and nodes $Nb_i$, are managed through the standardized 802.11n MAC/PHY layers.

Figure 3:
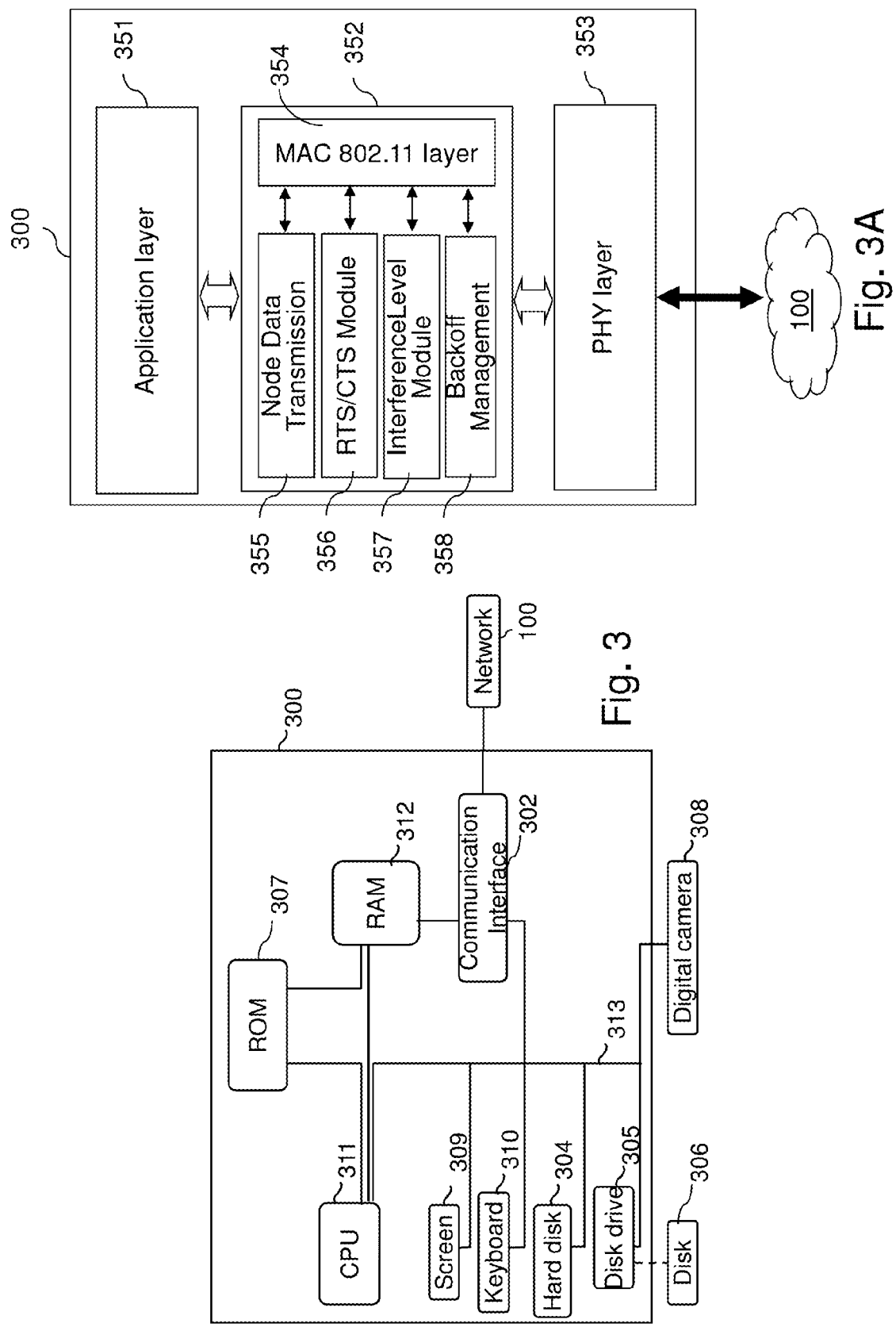
FIG. 3 is a block diagram illustrating components of a communicating device in which embodiments of the invention may be implemented.

FIG. 3 schematically illustrates a communicating device 300, operating as a transmitting or receiving node of the radio network 100, or a device embedding both transmitting and receiving functionalities, configured to implement at least one embodiment of the present invention when it is one of the collaborative nodes. The communicating device 300 may be a device such as a micro-computer, a workstation or a light portable device. The communicating device 300 comprises a communication bus 313 to which there are preferably connected:

- a central processing unit 311, such as a microprocessor, denoted CPU;
- a read only memory 307, denoted ROM, for storing computer programs for implementing the invention;
- a random access memory 312, denoted RAM, for storing the executable code of methods according to embodiments of the invention as well as the registers adapted to record variables and parameters necessary for implementing methods according to embodiments of the invention; and
- at least one communication interface 302 connected to the radio communication network 100 over which digital data packets are transmitted, for example a wireless communication network according to the 802.11n protocol. The data packets are written to the network interface for transmission or are read from the network interface for reception under the control of a software application running in the CPU 311.

Optionally, the communicating device 300 may also include the following components:

- a data storage means 304 such as a hard disk, for storing computer programs for implementing methods according to one or more embodiments of the invention;
- a disk drive 305 for a disk 306, the disk drive being adapted to read data from the disk 306 or to write data onto said disk;
- a screen 309 for displaying decoded data and/or serving as a graphical interface with the user, by means of a keyboard 310 or any other pointing means.

The communicating device 300 can be connected to various peripherals, such as for example a digital camera 308, each being connected to an input/output card (not shown) so as to supply data to the communicating device 300.

The communication bus provides communication and interoperability between the various elements included in the communicating device 300 or connected to it. The representation of the bus is not limiting and in particular the central processing unit is operable to communicate instructions to any element of the communicating device 300 directly or by means of another element of the communicating device 300.

The disk 306 can be replaced by any information medium such as for example a compact disk (CD-ROM), rewritable or not, a ZIP disk or a memory card and, in general terms, by an information storage means that can be read by a microcomputer or by a microprocessor, integrated or not into the apparatus, possibly removable and adapted to store one or more programs whose execution enables a method according to the invention to be implemented.

The executable code may be stored either in read only memory 307, on the hard disk 304 or on a removable digital medium such as for example a disk 306 as described previously. According to a variant, the executable code of the programs can be received by means of the communication network 303, via the interface 302, in order to be stored in one of the storage means of the communicating device 300, such as the hard disk 304, before being executed.

The central processing unit 311 is adapted to control and direct the execution of the instructions or portions of software code of the program or programs according to the invention, which instructions are stored in one of the aforementioned storage means. On powering up, the program or programs that are stored in a non-volatile memory, for example on the hard disk 304 or in the read only memory 307, are transferred into the random access memory 312, which then contains the executable code of the program or programs, as well as registers for storing the variables and parameters necessary for implementing the invention.

In this embodiment, the apparatus is a programmable apparatus which uses software to implement the invention. However, alternatively, the present invention may be implemented in hardware (for example, in the form of an Application Specific Integrated Circuit or ASIC).

FIG. 3A is a block diagram schematically illustrating the architecture of a node 300 adapted to carry out, at least partially, the invention, for example a node $Nc_i$ of FIG. 1. As illustrated, node 300 comprises a physical (PHY) layer block 353, a MAC layer block 352, and an application layer block 351.

The PHY layer block 353 (here a 802.11 standardized PHY layer) has the task of formatting and sending or receiving data packets over the radio medium used 100, such as a medium access request of the RTS type to reserve a transmission slot, a medium access response of the CTS type to acknowledge reservation of a transmission slot, as well as of data packets to/from that radio medium.

The MAC layer block 352 comprises a standard MAC 802.11 layer 354 and four additional blocks 355 to 358 for carrying out, at least partially, the invention. The MAC layer block 352 may be implemented in software, which software is loaded into RAM 312 and executed by CPU 311.

According to a particular embodiment, the node data transmission block 355 performs the task of exchanging data packets with the PHY layer 353 and the application layer 351. Block 355 may implement a gathering module designed for gathering duration fields in the sent medium access requests, a duration field in a medium access request sent by an active node defining a transmission time needed by that active node; and a sub-slot designing module designed for sizing the sub-slots and assigning the sized sub-slots to active nodes according to gathered duration fields, as further described below.

The RTS/CTS module 356 has the task of managing Request-To-Send (RTS) and Clear-To-Send (CTS) messages as described below according to the invention. In particular, it may implement a transmitting module designed for sending, over the radio network 100, a medium access request for a transmission slot; a receiving module designed for receiving, over the radio network, medium access requests for the same transmission slot from several respective active nodes of the set of collaborative nodes; a coordinator determining module designed for determining, based on the received medium access requests and on a predefined node order known by each collaborative node, whether said communicating collaborative node is a coordinator node which acknowledges reservation of said transmission slot on behalf of all the active nodes, or not; and a coordinator module designed for sending, if said communicating collaborative node is a coordinator node, a medium access response to acknowledge reservation of said transmission slot on behalf of all the active nodes, wherein the medium access response specifies, based on the sent and received medium access requests, the division of the transmission slot into sub-slots for respective active nodes to transmit data packets, as explained below.

The Interference Level Module 357 has the task of building and updating a local interference level table in order to provide for example a node order taking into account the interference of the collaborative nodes $Nc_i$ with legacy nodes $Nb_i$. For example, it may implement an interference software module designed for storing and managing a local interference level table, in particular for updating that local interference level table based on an interference level table transmitted by the coordinator node after the medium access response, as further described below.

The backoff management block 358 has the task of managing the backoff values used by the collaborative nodes in the collision avoidance scheme as described below. In particular, it may implement a backoff software module designed for managing a backoff counter for each of the collaborative nodes and for determining a time point after the expiry of the first backoff counter among all backoff counters as explained below, at which said communicating collaborative node has to send its own medium access request, based on the predefined node order known by each collaborative node and the size of a medium access request, as further described below.

Finally, the application layer block 351 implements an application that generates and receives data packets, for example data packets of a video stream.

Figure 4:
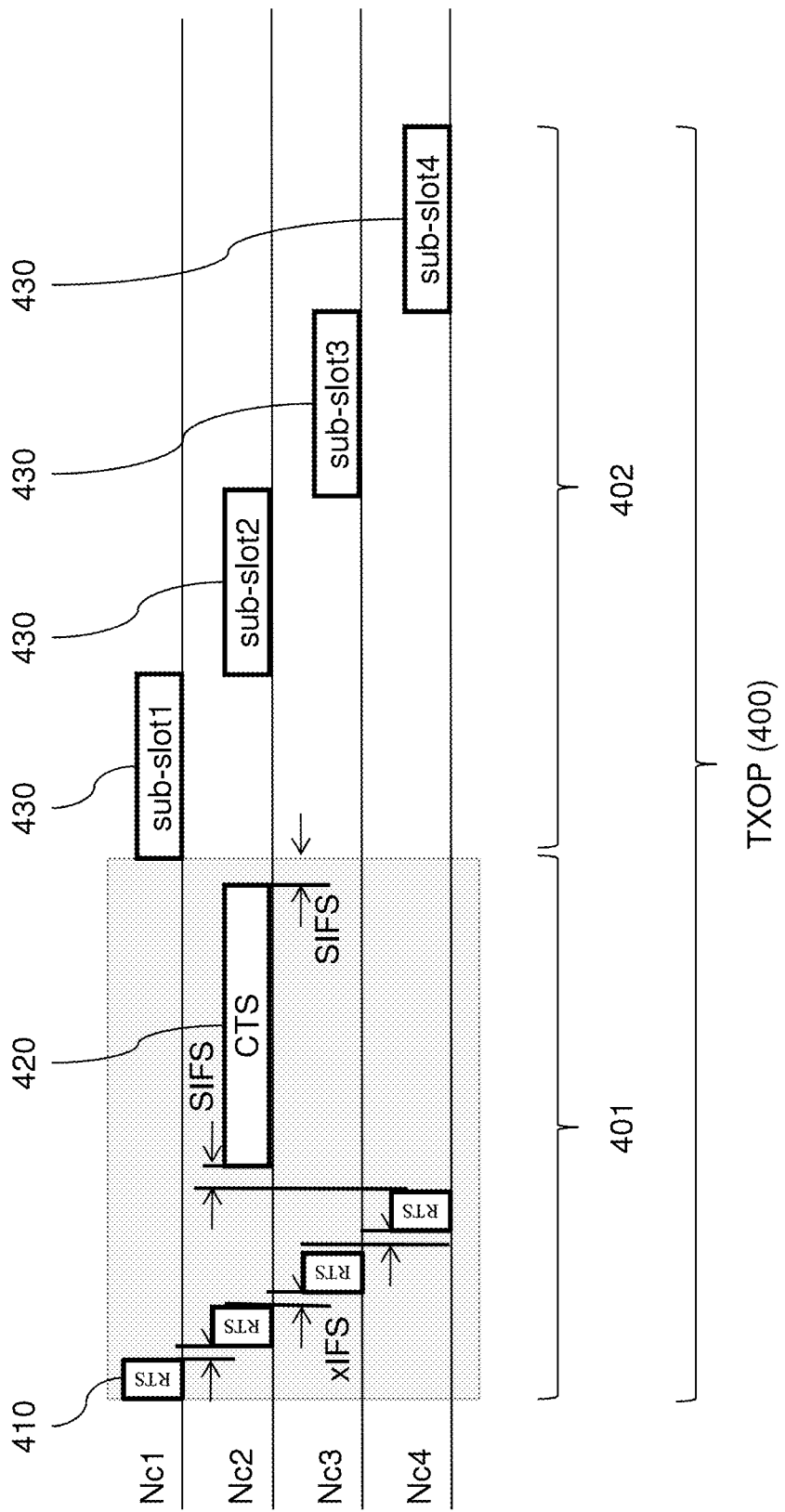
FIG. 4 is a timeline schematically representing an overview of a collaborative RTS/CTS mechanism and of transmission time slot sharing between collaborative nodes according to embodiments of the invention.

FIG. 4 gives an overview of a collaborative RTS/CTS mechanism between the nodes of a set of collaborative nodes $Nc_i$ according to the invention. This mechanism makes it possible for a transmission opportunity TXOP 400 including a reserved transmission time slot 402 to be granted for the collaborative nodes, wherein the reserved transmission time slot 402 is shared between some or all of the collaborative nodes as shown through the time sub-slots 430 assigned to respectively four nodes Nc1 to Nc4.

Thanks to a backoff procedure as described below, the collaborative nodes remain synchronized as long as they are not individually perturbed by a legacy node using the radio medium. If perturbed, a collaborative node becomes desynchronized with the others. However, since neighbouring collaborative nodes may be perturbed in a similar way, they can remain synchronized together but desynchronized with the other collaborative nodes. It results that several groups of synchronized collaborative nodes may simultaneously exists. "Active nodes" refers to those collaborative nodes remained synchronized. Preferably, the active nodes according to the invention are the nodes of the "first" group, i.e. the group of synchronized nodes that first detect an expiry of a backoff counter as described below. However, in a variant, the other groups of synchronized collaborative nodes may implement the steps of the invention to perform collaborative communication.

A collaborative RTS/CTS exchange period 401 comprises two phases, a first one regarding the transmission of RTS messages by the collaborative nodes to reserve the same transmission time slot 402 and the second one regarding the acknowledgment of the TXOP reservation by one relevant node among the collaborative nodes, referred below to as the coordinator node, that transmits an acknowledging CTS message.

During the first phase (described below with reference to FIG. 8), active nodes of the set of collaborative nodes $Nc_i$ send respective medium access requests RTS 410 for the same transmission slot 402, over the radio network 100. Active nodes are available to send a request RTS 410 during this first phase since they are synchronized. There may be other collaborative nodes that are liable to send a RTS request but out of this first phase because they are desynchronized with the active nodes due to the backoff procedure (resulting for example from a lock out of these collaborative nodes by on-going communications between legacy nodes in their vicinity, which on-going communications do not affect the active nodes).

Each collaborative node thus receives the medium access requests for the same transmission slot from the other active nodes of the set of collaborative nodes.

During the second phase (described below with reference to FIG. 9), the coordinator node sends a medium access response CTS 420 to acknowledge reservation of said transmission slot on behalf of all the active nodes, wherein the medium access response CTS specifies, based on the medium access requests RTS transmitted during the first phase, the division of the transmission slot 402 into sub-slots 430 for respective active nodes to transmit data packets. Specification of the division may comprise defining the number of sub-slots, the size of each sub-slot, and/or the assigning of each sub-slot to an active node.

As will be apparent from below, the selection of the coordinator node may be based on rules known by all the collaborative nodes, thus requiring that each collaborative node determines, based on the received medium access requests, whether it is the coordinator node which acknowledges reservation of the transmission slot 402 on behalf of all the active nodes, or not.

As shown in the Figure, a time interval xIFS, smaller than the conventional SIFS, is provided between each RTS sent by the active nodes.

Upon receiving the CTS message, the granted TXOP 402 slot is shared between the active collaborative nodes: each active node having sent an RTS message during the above first phase and which needs to communicate uses a sub-slot 430 assigned to it in order to transmit data packets.

Figure 5:
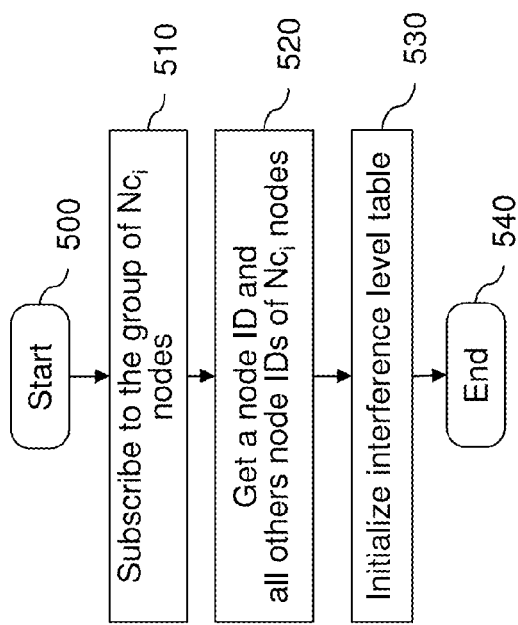
FIG. 5 is a flowchart illustrating steps of a node initialization process for a legacy node to join the collaborative communication service implementing the invention.

FIG. 5 illustrates a node initialization process for a node $Nc_j$ initially operating as a legacy node to subscribe to the collaborative communication service with a view to collaboratively communicating with the set or group of collaborative nodes $Nc_i$ using the invention. The subscription process may consist in joining a sub-network of the radio network and can be implemented by the MAC layer block 352.

At step 510, the node $Nc_j$ operating as a legacy node sends a dedicated 802.11 standard message, or "subscribing message", to all the yet collaborative nodes $Nc_i$ to subscribe to the group. A subscription process distributed over the collaborative nodes or implemented by one of them (for example the first one that defined the collaborative communication service or the current coordinator node as defined above) is executed based on the subscribing message received from the node $Nc_j$ operating as a legacy node. In particular a unique node identifier ID is assigned to that new node joining the group, which ID may be determined according to the 802.11 standard MAC protocol for the sub-network, for example as the MAC address of the node or as a function of the MAC address.

In response to the subscribing message sent, the node $Nc_j$ operating as a legacy node receives this unique node ID for identification in the collaborative communication service, as well as the IDs of the other collaborative nodes of the group, at step 520. Each collaborative node thus knows the exact composition of the collaborative group. The node IDs will also be used by the nodes to manage the backoff rule as described below, in particular to trigger the collaborative RTS/CTS exchange period 401, and may be used in some embodiments to define a node order.

Next, at step 530, the node $Nc_j$ that has just joined the group of collaboration nodes $Nc_i$ initializes a local interference level table used to associate each collaborative node of the group with an estimated level of interference between that associated collaborative node and legacy nodes external to the group. This interference level table is subject to regular updates in order for each collaborative node $Nc_i$ to track the interferences of the $Nc_i$ nodes with the legacy nodes $Nb_i$.

In embodiments of the invention, this interference level table is of particular importance since it is used for example to determine which collaborative node has to operate as a coordinator node for a given collaborative RTS/CTS exchange period 401 and to determine first the node order in which the collaborative nodes must send their RTS message and optionally the node order in which the time sub-slots 430 are assigned to said active nodes.

Figure 6:
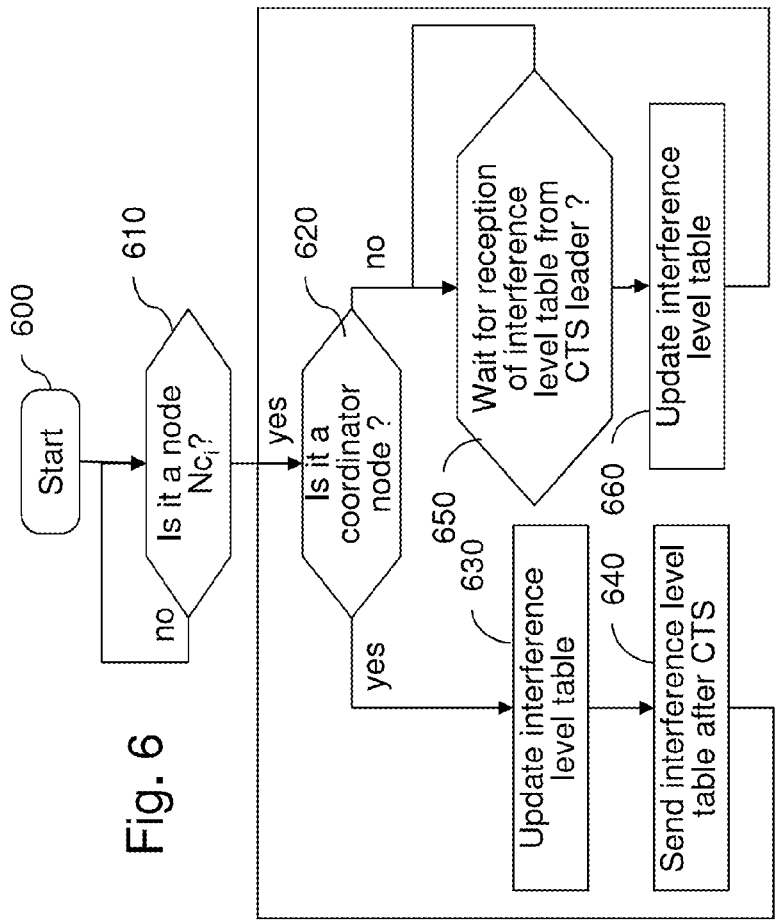
FIG. 6 is a flowchart illustrating steps of interference level table management process according to embodiments of the invention.

The management of the interference level table by the Interference Level Module 357 is now described with reference to FIG. 6, in particular when tracking the interference between $Nc_i$ nodes and the legacy nodes $Nb_i$.

In one embodiment of the invention, the level of interference for a collaborative node $Nc_i$ with the legacy nodes $Nb_i$ is computed based on the number of RTS messages 410 not sent by that particular collaborative node $Nc_i$ during several collaborative RTS/CTS exchange periods 401 experienced by the node. In other words, it is the difference between the number of such considered collaborative RTS/CTS exchange periods and the number of RTS messages sent by the particular node $Nc_i$ during these periods. To take into account the fact that the nodes may join the collaborative service at different points in time, a ratio between the non-sent RTS messages and the total number of collaborative RTS/CTS exchange periods experienced could be used. Also a predefined number of collaborative RTS/CTS exchange periods or only the collaborative RTS/CTS exchange periods that are less old than a predefined threshold (from their starting time point for example) may be considered when updating the table in order to keep only statistics on the most relevant events (i.e. the last ones because the network and the legacy nodes generally change).

As a result, failing to send an RTS message is considered such as that the node $Nc_i$ is not available (or disturbed) due to on-going communications between legacy nodes close in distance to the node $Nc_i$.

In this context, the management of the interference level tables starts at step 610 by determining whether or not the current node is a collaborative node $Nc_i$ or a legacy node $Nb_i$. Nothing happens as long as it is a legacy node.

When the node is a collaborative node $Nc_i$ it waits for the next collaborative RTS/CTS exchange period 401 during which RTS messages 410 for reserving the same transmission slot are received from other collaborative nodes (the "active nodes"). At the end of the RTS sending phase (above "first phase"), the node determines at step 620 whether or not it is a coordinator node, as described below, i.e. the node among the collaborative nodes that will have the task of sending the CTS message to acknowledge reservation of said transmission slot on behalf of all the active nodes. In particular, this determination is based on the interference level table and on the received RTS messages.

If it is the coordinator node, it updates at step 630 its local interference level table for the current collaborative RTS/CTS exchange period 401 based on the absence/presence of received RTS messages for each of the collaborative nodes. For example, it detects the RTS messages sent by the collaborative nodes during the first phase (RTS sending phase) of the collaborative RTS/CTS exchange period 401 and thus determine which collaborative node has not sent an RTS message (if any) and for which the level of interference should be increased.

Next, at step 640, it sends its local interference level table to the other collaborative nodes at the end of the collaborative RTS/CTS exchange period 401, in order for the whole group to keep synchronization of that table based on which decisions have to be taken. It is particularly important to synchronize the interference level tables of the nodes $Nc_i$ in embodiments of the invention in which the choice of the CTS message sender (i.e. the coordinator node) is based on this table.

Then the next collaborative RTS/CTS exchange period 401 is waited through step 620.

If the node determines that it is not the coordinator node, it waits at step 650 to receive the interference level table from the current coordinator node which is one active node from which it received a RTS message.

The new interference level table received from the coordinator node is used to update the local interference level table, generally through substitution of the tables at step 660. In other words, each collaborative node updates its local interference level table based on an interference level table transmitted by the coordinator node after the medium access response CTS. Of course, any other mechanism that makes it possible to exchange information about data reception quality of the collaborative nodes may be implemented in a variant in order to update the local interference level table and/or to determine the node order.

As provided in the 802.11 standard MAC protocol, a new RTS/CTS exchange period is triggered when a backoff counter expires. A particular backoff management is provided in the present invention to ensure the collaborative nodes to be able to send their RTS message at the appropriate time point during the collaborative RTS/CTS exchange period 401.

The backoff management block 358 provides means for the node 300 to generate a pseudo-random value using a node identifier ID as seed in order to compute a backoff value corresponding to a random number of backoff time slots selected in a dedicated range [0, CW], means for comparing a computed backoff value with backoff values used by the group of collaborative nodes, means for regenerating a new pseudo-random value if the computed backoff value is already used, and means for updating the backoff values used by the group of collaborative nodes.

It is to be noted that the means for pseudo-random generation in the backoff management block 358 are similar for all the nodes of the group of collaborative nodes. In other words, all the nodes of the group of collaborative nodes implement the same pseudo-random generator algorithm. For example, the pseudo-random value obtained by the pseudo-random generator algorithm executed in a node with a specific seed, after having been called a number j of times, is the same as the pseudo-random value obtain by the same pseudo-random generator algorithm executed in another node with the same specific seed, after having been called the same number j of times.

As a consequence, knowing the seed of the generator allows exactly the same series of random values to be retrieved in different collaborative nodes.

The backoff values represent the delay for the next transmission by the collaborative nodes.

The backoff values may be reinitialized from time to time, for example upon receiving a corresponding ResetRandomGen message from a collaborative node. For example, the ResetRandomGen message can contain a timestamp specifying the date at which the pseudo-random generators of all the collaborative nodes must be reinitialized. It should be noted that all these collaborative nodes must use a synchronization mechanism whose precision of the clock drift is not greater than the half duration of a aSlotTime time (which is the elementary time unit defined in the 802.11 standard, for example equal to 9 µs for the 802.11n standard, and based on which the other dedicated time periods such as DIFS, SIFS, xIFS are computed as multiples of that elementary time unit). The synchronization mechanism specified in the 802.11 standard, called the Timing Synchronization Function (TSF), provides for this requirement for a wireless network.

Each collaborative node $Nc_i$ thus calculates the backoff values of all the collaborative nodes of the group using the pseudo-random generator and stores them in a backoff table Backoff where Backoff[i] stores the backoff value of node $Nc_i$. For improved efficiency, the pseudo-random generator is used several times if needed to generate backoff values that are different one from the other.

Next, the backoff counters in each collaborative node are counted-down as long as the radio medium is idle, its value being evaluated by each respective collaborative node when a new DIFS (standing for Distributed InterFrame Space) period expires. Otherwise they are frozen in which case the collaborative node may become desynchronized with other collaborative nodes that still have their radio medium idle.

A new collaborative RTS/CTS exchange period 401 is triggered when a first backoff counter is supposed to expire, i.e. when there is an index j such that Backoff[j]=0. Since all the collaborative nodes have the same Backoff table they are able to determine the same triggering time point as long as they remain synchronized. Due to the counting down and the freezing of the backoff counters, there is generally a sub-set (or more) of the collaborative nodes that are still synchronized when that backoff counter expires, and synchronously (simultaneously) detect the expiry of that backoff counter. These particular collaborative nodes are the active nodes participating in the first phase of the new TXOP triggered by this expiry.

Figure 7:
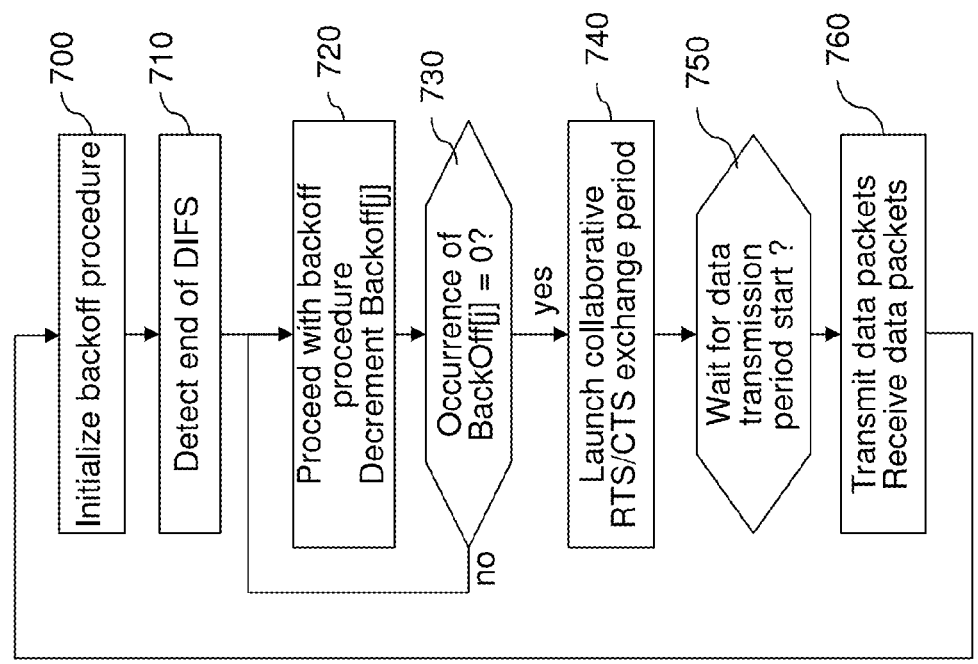
FIG. 7 is a flowchart illustrating general steps for a collaborative node to collaboratively communicate with other collaborative nodes according to embodiments of the invention.

With reference to FIG. 7, a collaborative communication between collaborative nodes $Nc_i$ is now described, that is driven by the Node Data Transmission block 355 of each collaborative node.

First steps 700 to 730 concern the backoff procedure as described above which is handled by the Backoff Management block 358.

The backoff value of a given collaborative node $Nc_i$ is initialized at step 700.

The collaborative node $Nc_i$ first senses the channel for a DIFS interval at step 710.

If the radio medium is idle for the entire initial DIFS interval, the collaborative node initiates its transmission process by invoking the backoff procedure using a backoff counter for each collaborative node, at step 720. Of course, as indicated above, the backoff procedure is invoked simultaneously in each collaborative node even the non-transmitting collaborative nodes in such a way each of them knows the current backoff values of the other nodes.

When one of the Backoffs[j] reaches 0 (test 730), the collaborative node triggers the next collaborative RTS/CTS exchange period 401 at step 740. This triggering launches the first phase of RTS message sending as described below with reference to FIG. 8.

The process waits (test 750) until the reception of a "data transmission period" event. Such message is for example send by the RTS/CTS module 356 when receiving a CTS message from the coordinator node or when sending the CTS message if the current collaborative node $Nc_i$ is the coordinator node.

Upon detection of the CTS message 420 acknowledging the reservation of the TXOP for the current collaborative RTS/CTS period 401, data packets are sent at step 760 using a time sub-slot assigned to the current collaborative node within the shared reserved transmission slot 402. Below details are given for the collaborative node to be able to determine at which time point in the reserved transmission time slot 402 it is authorized to send its data packets, if any. During this step, the current collaborative node may also receive data packets from other active nodes, in their corresponding assigned sub-slots.

Figure 8:
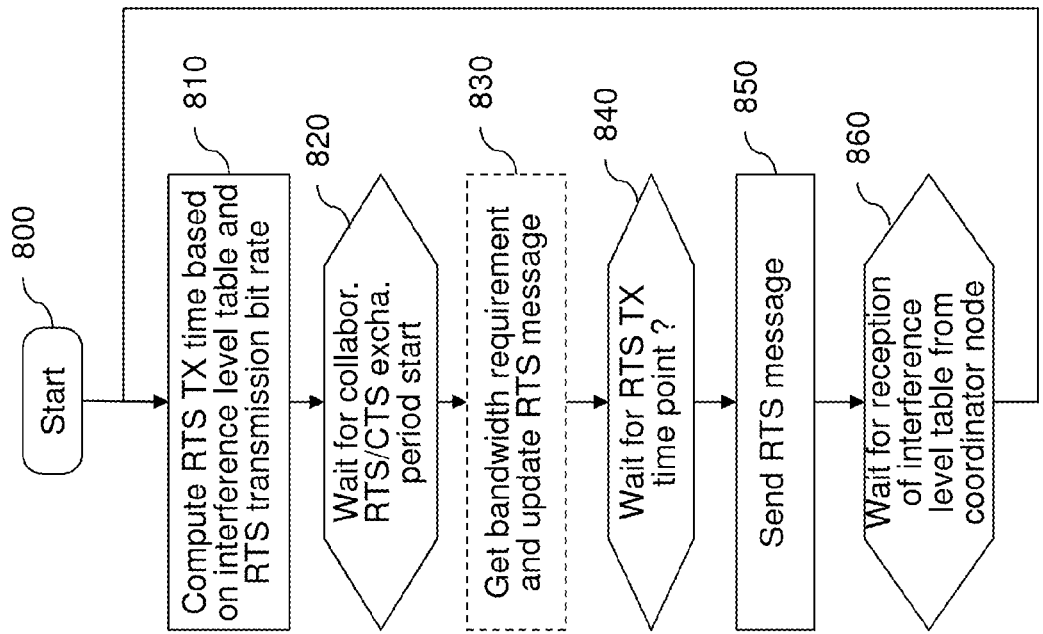
FIG. 8 is a flowchart illustrating processing steps for a collaborative node during the RTS sending phase of a collaborative RTS/CTS exchange period according to embodiments of the invention.

The first phase of the collaborative RTS/CTS exchange period 401 triggered at step 740 is now described with reference to FIG. 8. It is a RTS message sending process handled by the RTS/CTS Module 356 of each collaborative node $Nc_i$.

Due to this triggering, the sending of the medium access requests RTS by some of the collaborative nodes during the first phase (by the active nodes) starts from the expiry of a backoff counter among all the backoff counters, i.e. when one of the Backoffs[j] first reaches 0.

To avoid collision among the collaborative nodes $Nc_i$ it is important to defer the RTS message sending for a few microseconds between each collaborative node. To achieve that, an ordering of the collaborative nodes is provided and applied by the nodes when sending their RTS messages. In particular, the active nodes send the medium access requests substantially directly one after the other according to a predefined node order known by each collaborative node.

Several approaches may be implemented to define the node order that has to be used. A very simple way consists in defining a fixed node order for the RTS sending, which node order is defined as a function of a specific value associated with each collaborative node, for example as a function of the node ID of each collaborative node $Nc_i$. In that way, each collaborative node is able to dynamically update that order as the group of collaboration nodes evolves.

Another approach further described below consists in defining the node order according to an increasing interference level (i.e. priority) in the interference level table known by each collaborative node as described above with reference to FIGS. 5 and 6, the interference level table having node entries that associate each collaborative node with an estimated level of interference between the associated collaborative node and nodes external to the set.

In the 802.11 standard MAC protocol with RTS/CTS exchange, the RTS and CTS messages are sent at a low transmission bit rate or speed compared to the transmission bit rate used to transmit the data packets in the transmission time slot, to avoid transmission error.

Due to the invention, multiple RTS messages have to be sent (possibly one for each collaborative node) which would possibly result in increasing the overhead. In this context, embodiments of the invention provide that the medium access requests RTS are sent at a higher transmission bit rate than the 802.11 standard transmission bit rate used to send the medium access response by the coordinator node. The transmission bit rate to be used is predefined by the collaborative node $Nc_i$ for instance when a new node $Nc_i$ operating as a legacy node is subscribing to the group of collaborative nodes or when a collaborative node is detected to leave the group, to dynamically adjust the bit rate value in order to efficiently use the time period available so that the bandwidth consumption is reduced (for example by keeping the time period conventionally needed to transmit a conventional RTS message).

In particular, the higher transmission bit rate may be equal to a transmission bit rate at which the active nodes transmit data packets in the sub-slots.

One may note that the shorter correct reception range of the RTS due to a higher transmission bit rate (compared to conventional RTS) is counterbalanced by the multiplicity of RTS messages spread over the network cell. The the multiplicity of RTS messages of shorter communication time ensures instant-like reservation of the TXOP over the whole cell.

Once the strategy to define a node order and the transmission bit rate has been defined, the process starts at step 810 where each collaborative node $Nc_i$ determines a time point after said expiry of the first backoff counter among all backoff counters (triggering the collaborative RTS/CTS exchange period) at which that collaborative node has to send its own medium access request RTS, based on the predefined node order known by each collaborative node and the size of a medium access request (i.e. incidentally the RTS transmission bit rate).

In embodiments of the invention, each collaborative node determines this RTS sending time point following the node order defined by the interference level table (by interference level increasing order for example) and taking into account the RTS transmission bit rate. This may be done after the interference level table has been updated at step 660, i.e. before a new collaborative RTS/CTS exchange period 401 is triggered. This is to be sure that each collaborative node computes their transmission time point from the same node order.

The RTS message is preformatted specifying for example the transmission bit rate (information intended for the PHY layer block).

At step 820, the process waits for an event triggering the next collaborative RTS/CTS exchange period 401. This event comes from step 740 of FIG. 7.

Figure 12:
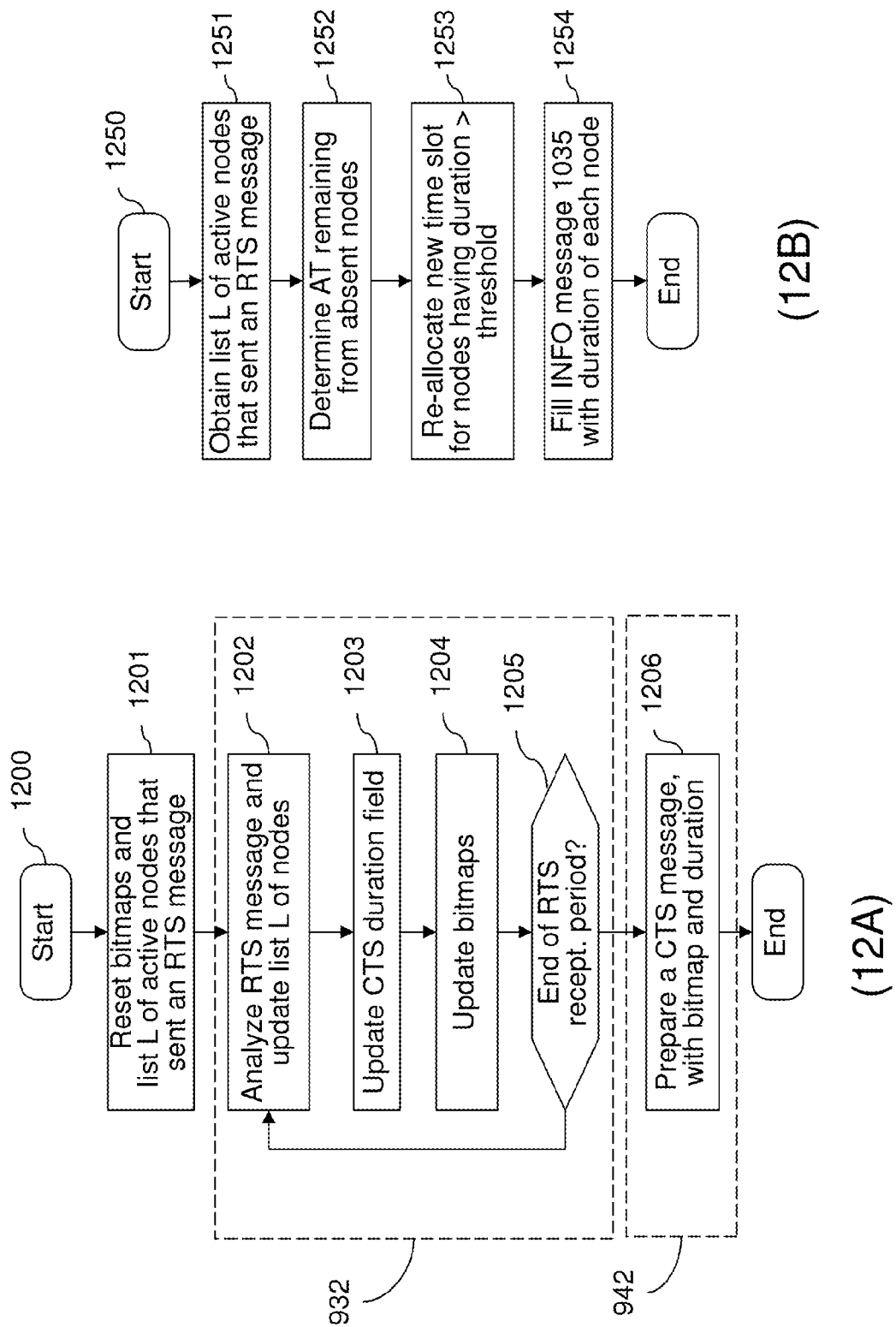
FIG. 12A is a flowchart illustrating processing steps for building the CTS message of FIG. 11 B according to an embodiment of the invention.
FIG. 12B is a flowchart illustrating processing steps for building the specific INFO data of FIG. 11C according to an embodiment of the invention.

When the next collaborative RTS/CTS exchange period starts, an optional step 830 consists for the current collaborative node in determining local bandwidth requirements and updating the preformatted RTS message with that information. As explained below with reference to FIGS. 10, 11 and 12, this information is used by the coordinator node to dynamically size and allocate sub-slots based on bandwidth requirements from the active nodes, in order to provide fair and precise sharing of the reserved transmission time slot 402.

When the transmission time point defined in step 810 for the current collaborative node is reached (step 840), the RTS message is sent at that time point if the radio medium is idle, at step 850. Collaborative nodes that succeed in sending their RTS message are referred to as active nodes.

Next, at step 860, the interference level table is awaited from the coordinator node in order to synchronize the current collaborative node with the same node order as the other collaborative nodes for the next collaborative RTS/CTS exchange period. The process then loops back to step 810.

Figure 9:
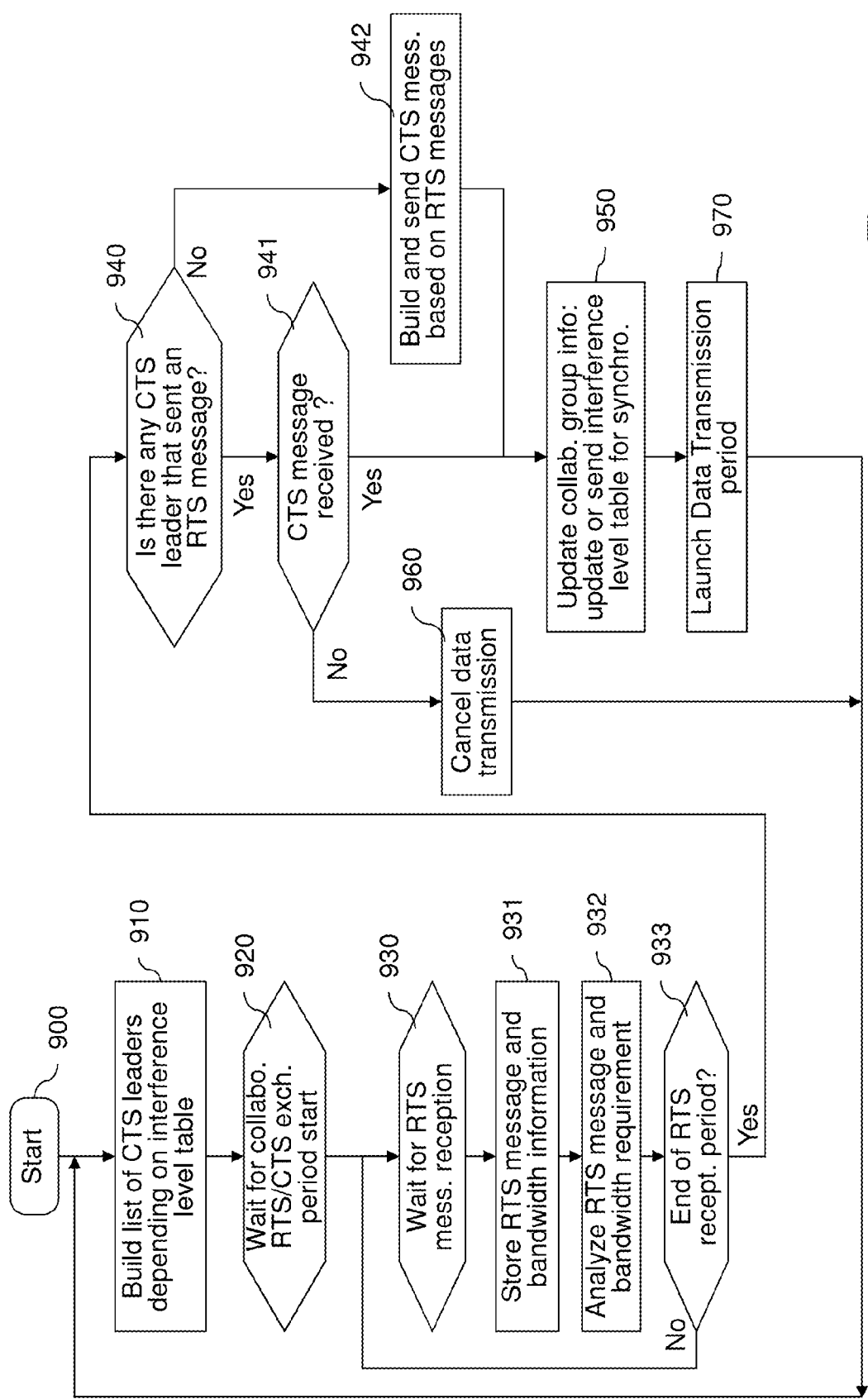
FIG. 9 is a flowchart illustrating processing steps for a collaborative node during the CTS sending phase of a collaborative RTS/CTS exchange period according to embodiments of the invention.

Next, the second phase of the collaborative RTS/CTS exchange period 401 triggered at step 740 is now described with reference to FIG. 9. It is a CTS message sending process handled by the RTS/CTS Module 356 of each collaborative node $Nc_i$ keeping in mind that only the coordinator node as defined below actually sends a CTS message to acknowledge grant of the TXOP 400.

The CTS message acknowledges reservation of the transmission slot 402 on behalf of all the active nodes. Embodiments of the invention further use the CTS message to signal the collaborative nodes $Nc_i$ with the division of the reserved transmission slot 402 into transmission sub-slots 430. As will be apparent from below, such division may define the number of sub-slots given for example the number of active nodes, may also define the size of the sub-slots given the bandwidth requirements specified by the active nodes in their RTS messages (this is further described below with reference to FIGS. 10, 11 and 12) and may also define the assigning of each created sub-slot to a respective active or collaborative node.

Of course, a simple embodiment that avoids overhead due to division signalling may consist in using a division strategy known by each collaborative node, such as for example splitting the transmission slot 401 into sub-slots for each collaborative node and assigning the sub-slots in the above-defined node order (based on the known interference level table or on the node IDs).

In the disclosed collaborative RTS/CTS exchange period, only one collaborative node sends the CTS message. It is referred to as the coordinator node for the current TXOP.

It is dynamically self-determined by each collaborative node. Here, dynamically means that the determination is performed at each new collaborative RTS/CTS exchange period (i.e. for each new transmission TXOP).

In embodiments of the invention, the dynamic determination is based on two requirements concerning the collaborative node. Other criteria may be implemented within the scope of the invention.

Firstly, the collaborative node must have sent an RTS message during the first phase of the collaborative RTS/CTS exchange period. That means it must be an "active node". This is to be sure that the node selected as coordinator senses the radio channel as idle and is thus able to send a CTS message.

Secondly, the collaborative node should be as little disturbed by the legacy nodes as possible in order for it to efficiently access the radio network. Of course, other embodiments may be implemented, such as using a predefined order of collaborative nodes instead of a disturbance-based or interference-based node order.

In practice, the coordinator node is selected from among the active nodes based on a predefined node order known by each collaborative node, so that all the collaborative nodes determine the same coordinator node. In particular, the node order is defined according to an increasing interference level within the above-defined interference level table known by each collaborative node. This is because the table gives a node order based on disturbance level (i.e. interference level).

To achieve a self-determination by each potential coordinator node (e.g. each active node if the first requirement is fulfilled), each active node determines whether or not it is the active node with the highest priority in the predefined node order, in which case it operates as the coordinator node.

In this context, step 910 consists for the collaborative nodes to build a list of CTS leaders based on the interference level table. For a current collaborative node, the CTS leaders are the active nodes that have a higher priority according to the node order than said current collaborative node, i.e. that are less disturbed according to the interference level table.

This is an easy task that can be done by each collaborative node upon updating its local interference level table (step 660) with a view to the next collaborative RTS/CTS exchange period 401. The task may consist in intersecting the list of the collaborative nodes (i.e. the IDs of the whole group) with a list of active nodes and with the interference level table.

Since this step 910 is preferably carried out in advance, steps 920 and 930 consist in respectively detecting the beginning of the next collaborative RTS/CTS exchange period and receiving an RTS message.

Upon receiving an RTS message from one active node, the current collaborative node stores it in memory so as to build a list of active nodes for the current transmission (step 931) and later analyses it to retrieve for instance the bandwidth requirements of each active node (step 932). Analysis of this information is further described below with reference to FIG. 12.

Step 933 consists in detecting the end of the first phase of the current collaborative RTS/CTS exchange period 401 (i.e. the end of the RTS message sending). The loop from step 933 to step 930 makes it possible to successively consider each received RTS message from the active nodes other than the current collaborative node.

The end of the first phase means that all the collaborative nodes with idle medium have sent their RTS message, possibly including their bandwidth requirements. The current collaborative node thus stores the list of the active nodes and corresponding bandwidth requirements.

Once the end of the first phase is detected, the current collaborative node checks at step 940 whether or not one of the CTS leader nodes listed in the above-defined list of CTS leaders has sent an RTS message for the current transmission. This is because it is enough to determine that the current collaborative node would therefore not be the coordinator node.

If there is one CTS leader having sent a RTS message, the current collaborative node has not the task of sending the CTS message, i.e. is not the coordinator node. In that case, at step 941, the current collaborative node waits for the CTS message from the coordinator node.

Upon receiving the CTS message, the information about the collaborative group is updated at step 950 based on the received CTS message and possible shared interference level table sent by the coordinator node together with the CTS message. In particular the interference level table and the number of collaborative nodes forming the group are updated.

If no CTS message is received or is received but corrupted, the data transmission TXOP is cancelled at step 960 and the process loops back to restart without update of the interference level table.

If, for the current collaborative node, no CTS leader has sent an RTS message, this means that the current collaborative node is the coordinator node and proceeds with the sending of the CTS message.

To achieve this, at step 942, the current coordinator node creates the CTS message taking into account the received RTS messages. In particular, as set out above and further disclosed below with reference to FIGS. 10, 11 and 12, the CTS message may comprise transmission slot division signalling information such as the number of sub-slots, the size of the sub-slots and/or the assigning of each created sub-slot to a respective active or collaborative node, each being determined based on the received RTS messages and the bandwidth requirements they comprise.

The current coordinator node then sends the created CTS message over the radio network.

Following step 942, step 950 consists in updating the collaborative group information based on that CTS message. For the current coordinator node, this corresponds to sending the local interference level table to the other collaborative nodes.

Following step 950, a data transmission time slot 402 is started. Access to the radio medium during that data transmission time slot 402 is fairly shared between the active nodes as defined in the created or received CTS message, a transmission time sub-slot 430 being assigned to each of all or part of the active nodes as further exposed below.

Figure 10:
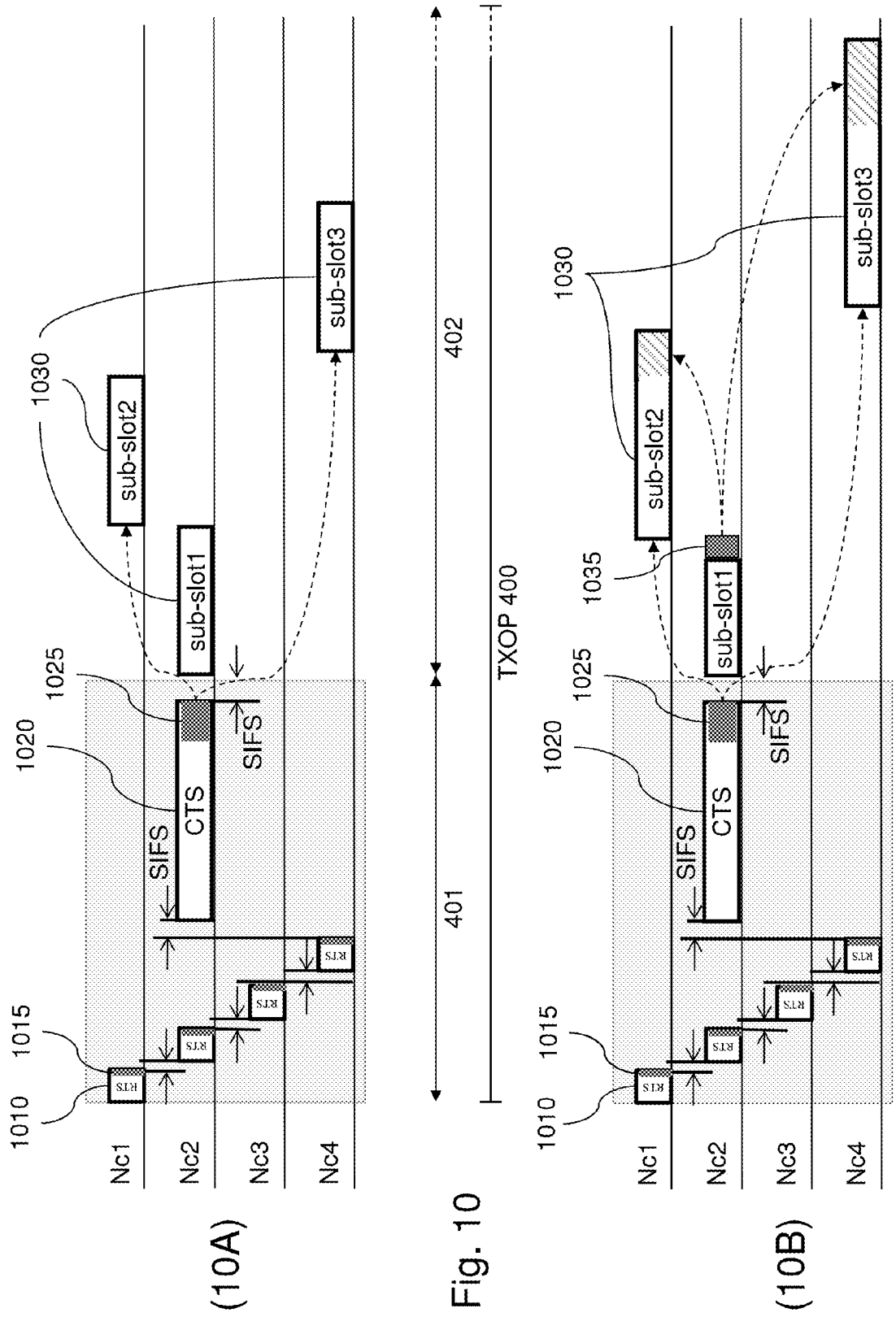
FIG. 10A is a timeline schematically illustrating re-ordering of shared sub-slots according to a first embodiment of the invention.
FIG. 10B is a timeline schematically illustrating re-allocating of shared sub-slots according to a second embodiment of the invention.

FIG. 10 illustrates dynamic or real-time sharing and allocations of transmission time sub-slots according to embodiments of the invention. FIG. 10A illustrates a dynamic allocation consisting in re-ordering the sub-slot allocation among the active nodes. FIG. 10B illustrates a dynamic allocation that further dynamically sizes the sub-slots according to the bandwidth requirements sent by the active nodes. This may be implemented in the emerging video codec schemes, like "lightly-compressed" codecs, which follow a normal distribution (characterized by its mean and variance parameters) of the encoded data per slice to size said slices. Such codecs offer non-deterministic packet size as each slice has a different size. As a consequence, the buffering at the MAC layer by the generated data packets is highly fluctuant.

To achieve the dynamic allocation, the conventional RTS and CTS messages of FIG. 4 are supplemented by additional information. FIG. 11A illustrates an example of a supplemented RTS message, while FIG. 11B illustrates an example of a supplemented CTS message where the additional information are inserted only in a data field.

The RTS message 1010 is similar to the RTS message 410, except that the duration field 1015 as shown in FIG. 11A is modified to contain the time (in micro seconds) requested according to the bandwidth needed (typically MAC buffering needs) by the corresponding collaborative node for a given sub slot 430. This is different from the conventional RTS message where the duration field is set for the whole transmission slot 402.

In one embodiment of the invention, the duration field 1015 of the RTS message 1010 takes the value 0 for any active node that has no data packet to send. This supplemental information is used to indicate that the corresponding active node (the node sending the RTS message) is willing to participate in the medium reservation only. This is particularly helpful to protect the wireless transmission area around that kind of active nodes from transmissions by legacy nodes.

This embodiment makes it possible to re-order the sub-slots taking into account the fact that some active nodes do not require a sub-slot, as shown in FIG. 10A where active node Nc3 does not have an assigned-to sub-slot.

Upon receiving the RTS messages from nodes Nc1, Nc3 and Nc4, the coordinator node (node Nc2) gathers the duration fields 1015 of those medium access requests RTS 1010, and assigns the sub-slots to the active nodes that have a non-zero duration field in their RTS messages (including Nc2).

To inform the active nodes of the sub-slot assignment, in order for those active nodes to be able to access the medium at the right moment, the CTS message 1020 comprises, compared to the conventional CTS message 420, a transmission slot division signalling information, in particular a supplemental data field 1025 in replacement of data free area in the conventional 802.11 CTS message to avoid signalling overhead.

This supplemental data field 1025 comprises at least two parts:
  a first bitmap 1026 identifying the active nodes (i.e. those having successfully sent an RTS message) among the collaborative nodes. This makes it possible for any node receiving the CTS message 1020 to know which collaborative nodes are involved in the sub-slot sharing. According to an implementation of the first bitmap 1026, each bit therein may specify whether or not a corresponding collaborative node is an active node (bit set respectively to 1 or 0), the corresponding collaborative nodes being according to a predefined node order known by each collaborative node, in particular the above-exposed interference-based node order (or any other node order based on criteria allowing node ranking, for example a predefined node order based on node IDs, a node order based on group joining date of each node, etc.). Such bitmap based on a known-by-node node order optimizes the use of the data free area; and
  a second bitmap 1027 identifying the active nodes having data packets to send (bit set to 1, and set to 0 if no data packet to send), i.e. the active nodes to which a sub-slot must be assigned. This makes it possible for any node receiving the CTS message 1020 to know which collaborative nodes have a sub-slot assigned to. The second bitmap 1027 may keep the same ordering as the first bitmap to optimize the use of the data free area.

These bitmaps are designed to allow real-time re-allocation of time sub-slots within the transmission time slot 402. They are built by the coordinator node based on the received and created RTS messages (to fill the first bitmap) and their duration fields (to fill the second bitmap) as illustrated now with reference to FIG. 12A.

The building process, implemented by the coordinator node (but possibly by all the collaborative nodes which finally will not send a CTS message), starts after a first backoff counter expires, i.e. when entering a new collaborative RTS/CTS exchange period at step 740 of FIG. 7.

At step 1201, the bitmap objects 1026 and 1027 are emptied, in order to be filled again in memory with new data and then inserted in a CTS message.

The next steps 1202 to 1204 are called through step 932 of analyzing the RTS messages received from the active nodes. These steps are thus performed for each newly received RTS message. They are also done when the current coordinator node creates its own RTS message to be sent.

At step 1202, a list L of active nodes having successfully sent a RTS message is updated, and corresponding non-zero duration field value is indicated when appropriate based on the received RTS message.

At step 1203, the duration field 1024 for the CTS message is updated to take into account the received RTS message, based on the duration field 1015 of the latter. For example, the value of the duration field 1024 at a given iteration (loop from 1205 to 1202) is the sum of the duration fields 1015 included in the medium access requests RTS so far received. Step 1203 only consists in adding the received duration field 1015 to the current sum.

Preferably, after the last iteration, the value of the duration field 1024 in the medium access response CTS equals:

$$\max\{TXOPlimit; \Sigma REQduration - SIFS - RESPlength\}$$

where TXOPlimit is an upper bound for transmission opportunities 400, $\Sigma REQduration$ is the sum of the duration fields 1015 included in the medium access requests RTS received, SIFS is a Short Interframe Space time length and RESPlength is the time length of the medium access response CTS.

This calculation of the CTS duration field 1024 sharply contrasts with conventional schemes where it is equal to the RTS duration field of only one RTS message, less SIFS and less RESPlength.

In the above formula, the duration fields of the RTS messages are cumulated in order to mirror the real needs of the group of collaborative nodes. And the cumulated RTS duration field (end of loop 1205) is substracted with SIFS and RESPlength timings in order to obtain the real occupation time. However, this value must not be greater than the standardized 802.11 TXOPlimit.

Following step 1203, step 1204 consists in updating the bitmap objects 1026 and 1027.

The first bitmap 1026 is updated by setting a true bit (bit set to 1) where a RTS message has been received for the corresponding collaborative node (according to the above-defined node order). This may be done based on the above-defined list L for the new entry at step 1202.

The second bitmap 1027 is also updated by setting a true bit (bit set to 1) where a non-zero duration field is defined in the RTS message received from the corresponding collaborative node (according to the above-defined node order). This may be done based on the above-defined list L for the new entry at step 1202.

While the second bitmap 1027 may be of the same length as the first bitmap 1026 (in which case where a bit is 0 in the first bitmap, it is also 0 in the second bitmap), an optimized implementation provides a second bitmap 1027 of shorter length by providing a bit only for each non-zero bit of the first bitmap 1026 while keeping the same node order. In other words, the second bitmap 1027 only lists the active nodes according to the above-defined node order.

It is clear from that building step that the bitmaps are created based on the received RTS messages.

Step 1205 makes it possible to successively consider each of the received RTS message to fill the bitmaps.

Next, the final CTS message is prepared at step 1206. This step is invoked by step 942 of FIG. 9 in which this final CTS message is sent by the coordinator node only.

The CTS message 1020 thus provides an explicit feedback in real-time to each active node of the group, in terms of presence of the other collaborative nodes and their activity (willing or not to send data packets). The information provided by the two bitmaps is useful for each active node to determine which data sub-slot 1030 has been allocated to it. In this first embodiment of FIG. 10A, the sub-slot 1030 is identical in duration time to the sub-slot 430 of FIG. 4.

This is because the allocation of the sub-slots may be in the same order as in the second bitmap, the total duration of the transmission time slot 402 being equally shared (the same length) between the active nodes willing to transmit data packets.

However, in a preferred embodiment, the first time sub-slot 1030 in the divided transmission slot 402 is assigned to the coordinator node. This makes it possible for the other active nodes to have time to process and analyze the received CTS message 1020 in order to determine their assigned-to time sub-slots, and for the coordinator node to send other useful transmission slot division signalling information in the first sub-slot if this information was not available when sending the CTS message (for example because of the amount of calculation to obtain it) as described for example below with reference to the second embodiment and corresponding INFO message 1035.

In both cases, the medium access response CTS includes transmission slot division information 1026-1027 that indicates the division of the transmission slot 402 into sub-slots 1030 and an assignment of each sub-slot to a respective active node.

In the example of FIG. 10A, the coordinator node is node Nc2 which is the first talker during the transmission time slot 402: sub-slot1 is reserved to node Nc2.

Node Nc3 has sent a RTS message with duration field 1015 set to 0, indicating that node Nc3 only participates in channel reservation. Nodes Nc1, Nc2 and Nc4 have sent RTS messages with non-zero duration fields 1015.

As a consequence, the supplemental data field 1025 contains a first bitmap 1026 with all collaborative nodes present (all bits set to 1), and a second bitmap 1027 with the third bit (reverse direction, or starting from LSB) set to 0 (if considering a node order based on node IDs).

This is why there will be no time sub-slot 1030 allowed for node Nc3. No sub-slot is thus assigned to an active node having sent a medium access request RTS with a duration field 1015 equal to 0.

Node Nc4 thus talks directly after node Nc1 instead of Nc3.

In a second embodiment of the invention that supplements the first embodiment, the duration field 1015 of the RTS message 1010 further defines the transmission time needed by the active node in order to transmit data packets, for example the required medium access time to empty its MAC buffer (i.e. payload waiting in the MAC buffer divided by the transmission bit rate for transmission of data packets). That means that each active node specifies bandwidth requirements in the medium access request RTS it sends. This supplemental information is used to indicate the amount of data the corresponding active node has to send over the radio medium.

This embodiment makes it possible to dynamically size and allocate the sub-slots taking into account the load of each active node, as shown in FIG. 10B where the sub-slots are differently sized according to corresponding active nodes. This is because the division of the transmission slot 402 into sub-slots 1030 is therefore based on bandwidth requirements defined by the active nodes in the medium access requests RTS they have sent.

Since the coordinator node makes a dynamic sub-slot sizing based on the received duration fields 1015, the coordinator node has to inform the other active nodes of the new sub-slot size. This is done through additional transmission slot division signalling information 1035, referred to as INFO message as shown in FIG. 11C.

The INFO message 1035 may be directly included in the supplemental data field 1025, as a third part 1028 in addition to the first and second bitmaps 1026-1027. This implementation will be used if the INFO message 1035 can be computed by the coordinator node before sending the CTS message 1020. This is to avoid signalling overhead.

Where the INFO message 1035 cannot be computed by the coordinator node before sending the CTS message 1020 (since its building may be time consuming), the INFO message 1035 is sent as additional signalling information, thus providing slight overhead. In that case, the supplemental data field 1025 comprises, in addition to the first and second bitmaps 1026-1027, a third part 1028 (e.g. only one bit) specifying whether or not an INFO message 1035 is to be sent. Based on the third part 1028, any active node receiving the CTS message 1020 will be waiting for the INFO message 1035 before determining its transmission time, since it depends on the sub-slot sizes.

As shown in FIG. 10B, the INFO message 1035 is sent by the coordinator node at the end of its assigned-to sub-slot, in particular the first sub-slot of transmission time slot 402. The time lengths of the sub-slots created based on the bandwidth requirements are thus defined in sub-slot information (INFO message) transmitted by the coordinator node in the first sub-slot of the reserved transmission slot, said first sub-slot being assigned to the coordinator node. This is because it gives time for the other active nodes to compute their exact transmission times given the sub-slot sizes specified in the INFO message 1035. Of course, the first sub-slot 1 assigned to the coordinator node may be of known size so that the next active node (i.e. the active node having the second sub-slot) is able to compute its transmission time before receiving the INFO message 1035.

As illustrated through FIG. 11C, the INFO message 1035 comprises:
- a first field 1036 specifying the number of element units 1037. As understood from below, this is the number of active nodes allowed to talk (i.e. to which sub-slots are allocated);
- a concatenated plurality of element units 1037 (below a maximum number) corresponding to the plurality of sub-slots 1030. Each element unit 1037 contains a number 1038 of elementary time units (for example in multiple units of 32 µs) composing the current sub-slot, followed by an identification 1039 of the assigned-to active node. The identification may comprise the node ID, the MAC address, etc.

A lighter version of the INFO message 1035 only comprises a plurality of numbers 1038 of elementary time units corresponding respectively to the plurality of non-zero bits in the second bitmap 1027, keeping the same order. This makes it possible to directly link the numbers 1038 to each corresponding active node that needs to talk and thus to each sub-slot 1030 given the known node order of the bitmaps.

This reduces signalling overhead since no identification of the nodes is needed.

If dynamic sizing of the sub-slots is enabled in the collaboration communication service, the coordinator node sets the third part 1028 to 1 at step 1206.

The building of the INFO message 1035 by the coordinator node, i.e. the calculation of the duration of each sub-slot 1030, is now described with reference to FIG. 12B, which occurs for example just after step 1206.

This INFO message building process may take place during the sending 942 of the CTS message 1020 and during sub-slot 1 which is assigned to the coordinator node, since the INFO message 1035 has to be sent only at the end of that sub-slot 1.

This building process starts at step 1251 by obtaining the list L of the active nodes as iteratively built at step 1202, wherein the update at step 1202 also consists in storing the requested bandwidth by each active node, as specified in the duration field 1015 of the received RTS message.

From this list L, step 1252 determined an available time AT resulting from the missing collaborative nodes. This is because the bandwidth requested through the RTS messages sent by the collaborative nodes may involve collaborative nodes that are not active or not available (due to disturbance from legacy nodes).

This available time AT may thus be determined as summing the transmission time requested through the RTS messages for which the destination node is missing (not active).

According to the types of data packets, it may be decided to keep a data sub-slot 1030 for particular data packets, for example in case of multicast flow where at least the sending node and one receiving node are still present but other receiving nodes are missing.

At step 1253, the active nodes of list L with a transmission duration requested greater than a mean time are identified, and will be granted a longer time access by using part of the calculated AT. The mean time may be defined for example as the ratio between the entire reserved transmission time slot (as defined in duration field 1024 of CTS message) and the number of active nodes needing transmission time (requested duration in RTS message being non zero).

Any scheduler can be used. For example the remaining time AT may be equally shared between the identified active nodes. Of course, other criteria, such as a priority of the data packets for each node or of the collaborative nodes, may be considered to grant more remaining time to some active nodes than to other active nodes.

Refining this approach may also be performed. For example the extra time between the requested transmission duration and the mean time (if the requested transmission duration is less than the mean time) may also be shared between the active nodes having requested transmission duration higher than the mean time.

Once the sharing of the remaining and extra time AT between the active nodes has been performed, the computed allocation is prepared at step 1254 by filling the INFO message 1035.

In a particular sub-embodiment, a number of elementary time units may always be kept free by the scheduler when computing fixed size of slots 330: this would support to have extra time available for dealing with fluctuant requests requiring little time adaptation even if all collaborative nodes are present.

Referring back to FIG. 10B, nodes Nc1 and Nc4 are granted larger sub-slots (No 2 and 3) than in the case of FIG. 10A, due to available extra time. In the Figure, the hatched zones represent the extra time offered to sub-slot2 and sub-slot3.

Due to arbitration by the coordinator node between all the transmission durations requested by the active nodes, it is possible, while not represented in the Figure, for the granted time duration (i.e. the size of the assigned-to sub-slot) to be less than the requested time duration.

Figure 13:
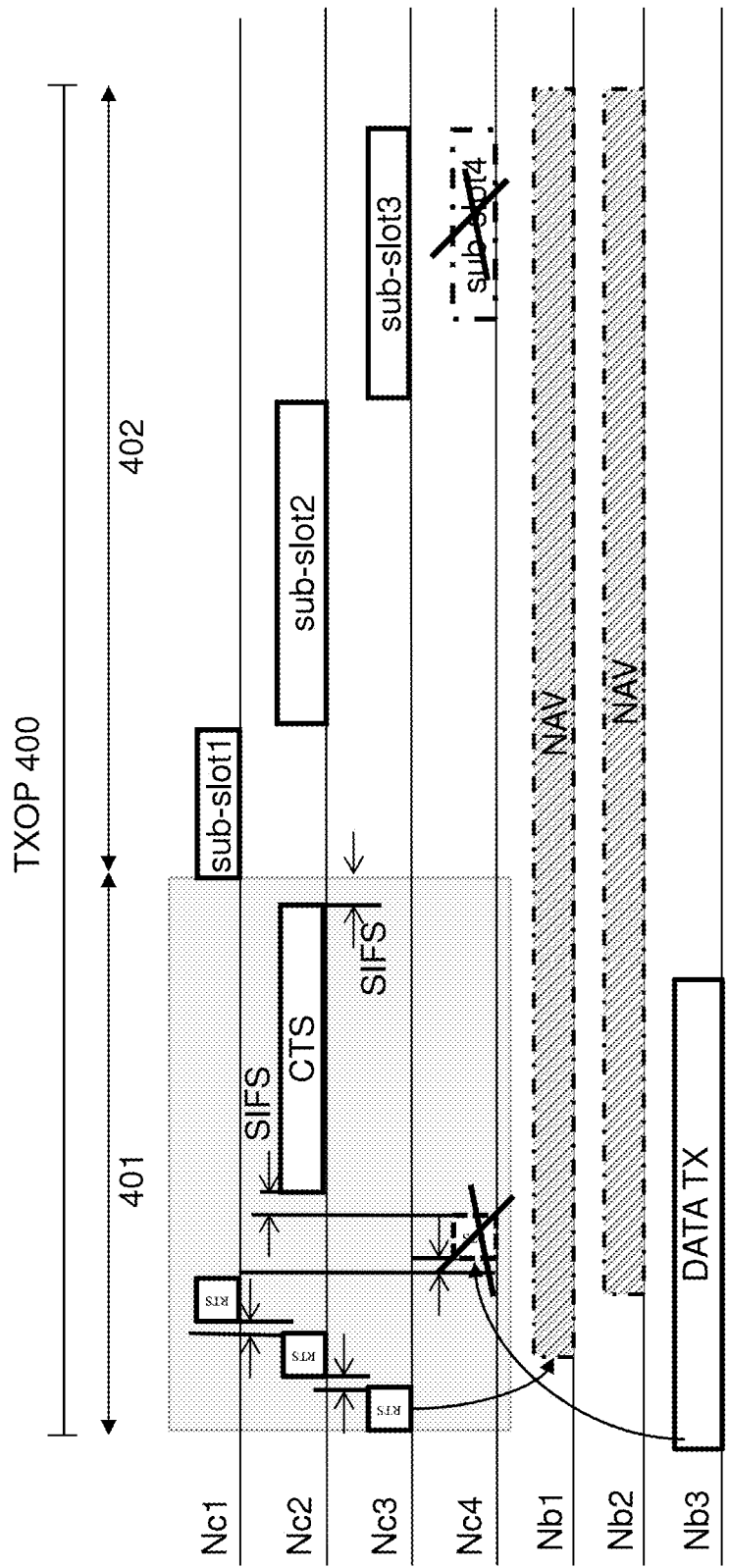
FIG. 13 is a timeline schematically illustrating interactions between collaborative nodes implementing the invention and legacy nodes in their vicinity.

FIG. 13 illustrates the effects on legacy nodes of implementing the invention as described above, from the radio medium access point of view and the dynamic transmission slot sharing.

In the example of the Figure, the legacy nodes Nb1, Nb2, Nb3 are respectively in the vicinity of the collaborative nodes Nc3, Nc2 and Nc4. They are thus liable to disturb the latter.

The collaborative RTS/CTS exchange period according to embodiments of the invention starts by Nc3 emitting a first RTS message in case of an idle radio medium. If the RTS message from Nc3 does not collide with any other packet, it causes blocking of the legacy nodes in its vicinity, e.g. node Nb1 which set its NAV.

Similarly, Nc2 sends its RTS message which, in absence of collision, blocks the legacy node Nb2 (NAV set).

However, it is the contrary for the collaborative node Nc4 which is perturbed by an on-going transmission from the legacy node Nb3. Nc4 will not be able to send a RTS message, meaning that it will not participate in the next transmission. No time sub-slot is thus granted to Nc4 by the coordinator node Nc2, but the transmission sub-slot which possibly would have been granted to it is now re-allocated to the other sub-slots (i.e. to the active nodes).

The proposed mechanism enhances the standardized RTS/CTS scheme by reducing the probability of collisions for the area of reception around each collaborative node: any node that is out of the transmission range of one active node (i.e. RTS message sender) or from the coordinator node (i.e. CTS message sender) may be in the transmission range of another active collaborative node sending a RTS message.

Although the present invention has been described hereinabove with reference to specific embodiments, the present invention is not limited to the specific embodiments, and modifications which lie within the scope of the present invention will be apparent to a person skilled in the art. Many further modifications and variations will suggest themselves to those versed in the art upon making reference to the foregoing illustrative embodiments, which are given by way of example only and which are not intended to limit the scope of the invention as determined by the appended claims. In particular different features from different embodiments may be interchanged, where appropriate.

The invention claimed is:

1. A method for data communication between active nodes of a set of collaborative nodes configured to collaboratively communicate in a radio network, the method comprising:
    sending, by each active node of the set of collaborative nodes, a medium access request for a same transmission slot, over the radio network;
    sending, by one of the active nodes, referred to as coordinator node, a medium access response to acknowledge reservation of said same transmission slot on behalf of all the active nodes, upon receiving the sent medium access requests, wherein the same transmission slot is divided, based on the sent medium access requests, into a plurality of sub-slots for respective active nodes to transmit data packets;
    wherein each collaborative node has an associated backoff counter to implement a Collision Avoidance mechanism, the backoff counter being counted-down as along as the associated collaborative node detects the radio network as idle,
    wherein each collaborative node knows a current value of each backoff counter of the other collaborative nodes,
    sending the medium access requests by the active nodes starts from an expiry of a first backoff counter of a first active node among all backoff counters, wherein at least one active node different from the first active node sends its medium access request while its own associated backoff counter has not expired due to different backoff values.

2. The communication method of claim 1, wherein the active nodes send a request-to-send (RTS) message of a Carrier Sense Multiple Access with Collision Avoidance protocol (CSMA/CA), and the coordinator node sends in response a Clear-To-Send (CTS) message of a same protocol.

3. The communication method of claim 1, wherein the active nodes send the medium access requests one after the other according to a predefined node order known by each collaborative node.

4. The communication method of claim 3, wherein the predefined node order is defined according to an increasing interference level within an interference level table known by each collaborative node, the interference level table having node entries that associate each collaborative node with an estimated level of interference between the associated collaborative node and nodes external to the set.

5. The communication method of claim 1, further comprising determining, by each collaborative node, a time point after said expiry of the first backoff counter among all backoff counters at which that collaborative node has to send its own medium access request, based on a predefined node order known by each collaborative node and a size of a medium access request.

6. The communication method of claim 1, wherein the active nodes are nodes of the set of collaborative nodes that synchronously detect an expiry of a backoff counter among backoff counters associated with each of the collaborative nodes.

7. The communication method of claim 1, wherein the medium access requests are sent with a higher transmission bit rate than a transmission bit rate used to send the medium access response by the coordinator node.

8. The communication method of claim 1, wherein each active node specifies bandwidth requirements for a next transmission opportunity in the medium access request it sends.

9. The communication method of claim 8, wherein the medium access request comprises a duration field to specify a needed transmission time or taking a value 0 for any active node that has no data packet to send.

10. The communication method of claim 1, wherein the coordinator node is selected from among the active nodes based on a predefined node order known by each collaborative node.

11. The communication method of claim 10, wherein each active node determines whether or not it is the active node with a highest priority in the predefined node order, in which case it operates as the coordinator node.

12. The communication method of claim 10, wherein the predefined node order is defined according to an increasing interference level within an interference level table known by each collaborative node, the interference level table having node entries that associate each collaborative node with an estimated level of interference between the associated collaborative node and nodes external to the set.

13. The communication method of claim 12, further comprising updating, by each collaborative node, its local interference level table based on an interference level table transmitted by the coordinator node after the medium access response.

14. The communication method of claim 13, wherein each collaborative node updates a level of interference of node entries in its local interference level table based on an absence of received medium access request from the associated collaborative node.

15. The communication method of claim 1, wherein the medium access response comprises a duration field, whose value is based on a sum of duration fields included in the medium access requests sent from the active nodes.

16. The communication method of claim 1, wherein the medium access response includes transmission slot division information that indicates the division of the transmission slot into sub-slots and an assignment of each sub-slot to a respective active node.

17. The communication method of claim 16, wherein the transmission slot division information comprises a first bitmap ordered according to a predefined node order known by each collaborative node, each bit of which specifying whether or not a collaborative node is an active node.

18. The communication method of claim 17, wherein the transmission slot division information comprises a second bitmap with a same ordering, a plurality of bits of which specifying whether or not the active nodes needs a sub-slot to transmit data packets.

19. The communication method of claim 1, wherein the first sub-slot in the divided transmission slot is assigned to the coordinator node.

20. The communication method of claim 1, wherein the division of the transmission slot into sub-slots is based on bandwidth requirements defined by the active nodes in the medium access requests they have sent.

21. The communication method of claim 1, further comprising, at the coordinator node, gathering duration fields in the sent medium access requests, a duration field in a medium access request sent by an active node defining a transmission time needed by that active node, and sizing the sub-slots and assigning the sized sub-slots to active nodes according to the gathered duration fields.

22. The communication method of claim 21, wherein no sub-slot is assigned to an active node having sent a medium access request with a duration field equal to 0.

23. The communication method of claim 21, wherein time lengths of the sub-slots created based on bandwidth requirements is defined in sub-slot information transmitted by the coordinator node in a first sub-slot of the reserved transmission slot, the first sub-slot being assigned to the coordinator node.

24. A network system for data communication between nodes of a set of collaborative nodes configured to collaboratively communicate in a radio network, the system comprising:
- active nodes of the set of collaborative nodes configured to send respective medium access requests for a same transmission slot, over the radio network;
- wherein one of the active nodes, referred to as coordinator node, is configured to send a medium access response to acknowledge reservation of said same transmission slot on behalf of all the active nodes, upon receiving the sent medium access requests, the transmission slot being divided, based on the sent medium access requests, into sub-slots for respective active nodes to transmit data packets,
- wherein each collaborative node has an associated backoff counter to implement a Collision Avoidance mechanism, the backoff counter being counted-down as long as the associated collaborative node detects the radio network as idle,
- each collaborative node knows a current value of each backoff counter of the other the collaborative nodes, and
- sending the medium access requests by the active nodes starts from an expiry of a first backoff counter of a first active node among all backoff counters, wherein at least one active node different from the first active node sends its medium access request while its own associated backoff counter has not expired due to different backoff values.

25. A method for data communication between nodes of a set of collaborative nodes defined to collaboratively communicate in a radio network, each collaborative node having an associated backoff counter to implement a Collision Avoidance mechanism, a value of all the backoff counters being known by all collaborative nodes, the method comprising, at one of the collaborative nodes:
- determining an expiry of a first backoff counter among all backoff counters;
- during a reception period from the determined expiry,
- sending, over the radio network, a medium access request for a transmission slot; receiving, over the radio network, medium access requests for the same transmission slot from several respective active nodes of the set of collaborative nodes;
- based on the received medium access requests and on a predefined node order known by each collaborative node, determining whether said one collaborative node is a coordinator node which acknowledges reservation of said transmission slot on behalf of all the active nodes, or not;
- if said one collaborative node is a coordinator node, sending a medium access response to acknowledge reservation of said transmission slot on behalf of all the active nodes, wherein the medium access response specifies, based on the sent and received medium access requests, a division of the transmission slot into sub-slots for respective active nodes to transmit data packets,
- wherein each collaborative node has an associated backoff counter to implement a the Collision Avoidance mechanism, the backoff counter being counted-down as long as the associated collaborative node detects the radio network as idle,
- each collaborative node knows a current value of each backoff counter of the other collaborative nodes, and
- sending the medium access requests by the active nodes starts from the expiry of a first backoff counter of a first active node among all backoff counters, wherein at least one active node different from the first active node sends its medium access request while its own associated backoff counter has not expired due to different backoff values.

26. The communication method of claim 25, further comprising waiting to receive a medium access response acknowledging reservation of said transmission slot on behalf of all the active nodes from one of said active nodes, and determining from the medium access response a sub-slot of the transmission slot to transmit data packets from one communicating collaborative node.

27. A communicating collaborative node for data communication with other nodes of a set of collaborative nodes configured to collaboratively communicate in a radio network, the communicating collaborative node comprising a processor coupled with a memory including:
- sends, over the radio network, a medium access request for a transmission slot;
- receives, over the radio network, medium access requests for the same transmission slot from several respective active nodes of the set of collaborative nodes;
- determines, based on the received medium access requests and on a predefined node order known by each collaborative node, whether said communicating collaborative node is a coordinator node which acknowledges reservation of said transmission slot on behalf of all the active nodes, or not; and
- sends, if said communicating collaborative node is a coordinator node, a medium access response to acknowledge reservation of said transmission slot on behalf of all the active nodes, wherein the medium access response specifies, based on the sent and received medium access requests, a division of the transmission slot into sub-slots for respective active nodes to transmit data packets;
- wherein each collaborative node has an associated backoff counter to implement a Collision Avoidance mechanism, the backoff counter being counted-down as long as the associated collaborative node detects the radio network as idle,
- each collaborative node knows a current value of each backoff counter of the other collaborative nodes, and
- sending the medium access requests by the active nodes starts from an expiry of a first backoff counter of a first active node among all backoff counters, wherein at least one active node different from the first active node sends its medium access request while its own associated backoff counter has not expired due to different backoff values.

28. A non-transitory computer-readable medium storing a program which, when executed by a microprocessor or computer system in an apparatus communicating data with other nodes of a set of collaborative nodes configured to collaboratively communicate in a radio network, causes the apparatus to perform the steps of:
- sending, over the radio network, a medium access request for a transmission slot; receiving, over the radio network, medium access requests for the same transmission slot from several respective active nodes of the set of collaborative nodes;

based on the received medium access requests, determining, based on a predefined node order known by each collaborative node, whether said apparatus is a coordinator node which acknowledges reservation of said transmission slot on behalf of all the active nodes;

if said apparatus is a coordinator node, sending a medium access response to acknowledge reservation of said transmission slot on behalf of all the active nodes, wherein the medium access response specifies, based on the sent and received medium access requests, the division of the transmission slot into sub-slots for respective active nodes to transmit data packets, wherein each collaborative node has an associated backoff counter to implement a Collision Avoidance mechanism, the backoff counter being counted-down as long as the associated collaborative node detects the radio network as idle, each collaborative node knows a current value of each backoff counter of the other collaborative nodes, and sending the medium access requests by the active nodes starts from an expiry of a first backoff counter of a first active node among all backoff counters, wherein at least one active node different from the first active node sends its medium access request while its own associated backoff counter has not expired due to different backoff values.

* * * * *